(12) United States Patent
Hart et al.

(10) Patent No.: US 11,738,339 B2
(45) Date of Patent: Aug. 29, 2023

(54) MICROFLUIDIC DEVICES AND METHOD FOR SAMPLING AND ANALYSIS OF CELLS USING OPTICAL FORCES AND RAMAN SPECTROSCOPY

(71) Applicant: Lumacyte, LLC, Charlottesville, VA (US)

(72) Inventors: Sean Hart, Keswick, VA (US); Colin Hebert, Charlottesville, VA (US)

(73) Assignee: LUMACYTE, INC., Charlottesville, VA (US)

( * ) Notice: Subject to any disclaimer, the term of this patent is extended or adjusted under 35 U.S.C. 154(b) by 300 days.

(21) Appl. No.: 17/016,079

(22) Filed: Sep. 9, 2020

(65) Prior Publication Data

US 2021/0121878 A1    Apr. 29, 2021

Related U.S. Application Data

(60) Provisional application No. 62/897,437, filed on Sep. 9, 2019.

(51) Int. Cl.
*G01N 15/14* (2006.01)
*B01L 3/00* (2006.01)
*G01N 15/10* (2006.01)

(52) U.S. Cl.
CPC .... *B01L 3/502715* (2013.01); *G01N 15/1434* (2013.01); *G01N 15/1484* (2013.01);
(Continued)

(58) Field of Classification Search
CPC .. G01N 21/658; G01N 21/0303; G01N 21/05; G01N 21/65
See application file for complete search history.

(56) References Cited

U.S. PATENT DOCUMENTS

| 6,416,642 B1 * | 7/2002 | Alajoki | B01L 3/50273 |
| | | | 435/287.7 |
| 7,515,269 B1 * | 4/2009 | Alexander | G01N 21/658 |
| | | | 356/445 |

(Continued)

FOREIGN PATENT DOCUMENTS

| CN | 1957245 A | * | 5/2007 | ........... G01N 21/658 |
| WO | WO-0070353 A2 | * | 11/2000 | ............... C12Q 1/00 |
| WO | WO-2019040599 A1 | * | 2/2019 | .......... B01J 19/0046 |

*Primary Examiner* — Rebecca C Bryant
(74) *Attorney, Agent, or Firm* — DLA PIPER LLP (US)

(57) ABSTRACT

Provided are methods and devices for automated analysis of one or more samples in single or multi-well plates or vessels, wherein the process of automated analysis comprises flow and hydrodynamic, electrokinetic, and optical forces for the analysis and sorting of samples, wherein the samples comprise liquid or particles in microfluidic channels, and wherein the devices comprise an assembly of components that enable processing of a said samples for analytical assessment by fluidic and/or particle based instruments. Microfluidic structures (channels, "T's", "Y's", branched "Y's", wells, and weirs) are described for facilitating sample interaction and observation, sample analysis, sorting, or isolation. Detection can be accomplished using spectroscopic methods including, but not limited to, Raman spectroscopy of single cells and bulk cellular samples (collections of cells; several individuals to hundreds or thousands of cells).

24 Claims, 20 Drawing Sheets

(52) U.S. Cl.
CPC ........... *B01L 2200/0689* (2013.01); *B01L 2300/0645* (2013.01); *B01L 2300/0654* (2013.01); *B01L 2300/0838* (2013.01); *G01N 2015/1006* (2013.01)

(56) References Cited

U.S. PATENT DOCUMENTS

| | | | |
|---|---|---|---|
| 10,549,273 B2* | 2/2020 | Gasperino | G01N 33/48707 |
| 2014/0090979 A1* | 4/2014 | Terray | B81B 7/02 |
| | | | 204/601 |
| 2019/0308191 A1* | 10/2019 | Hart | B01L 3/50273 |
| 2021/0332910 A1* | 10/2021 | Chen | F16K 31/088 |

* cited by examiner

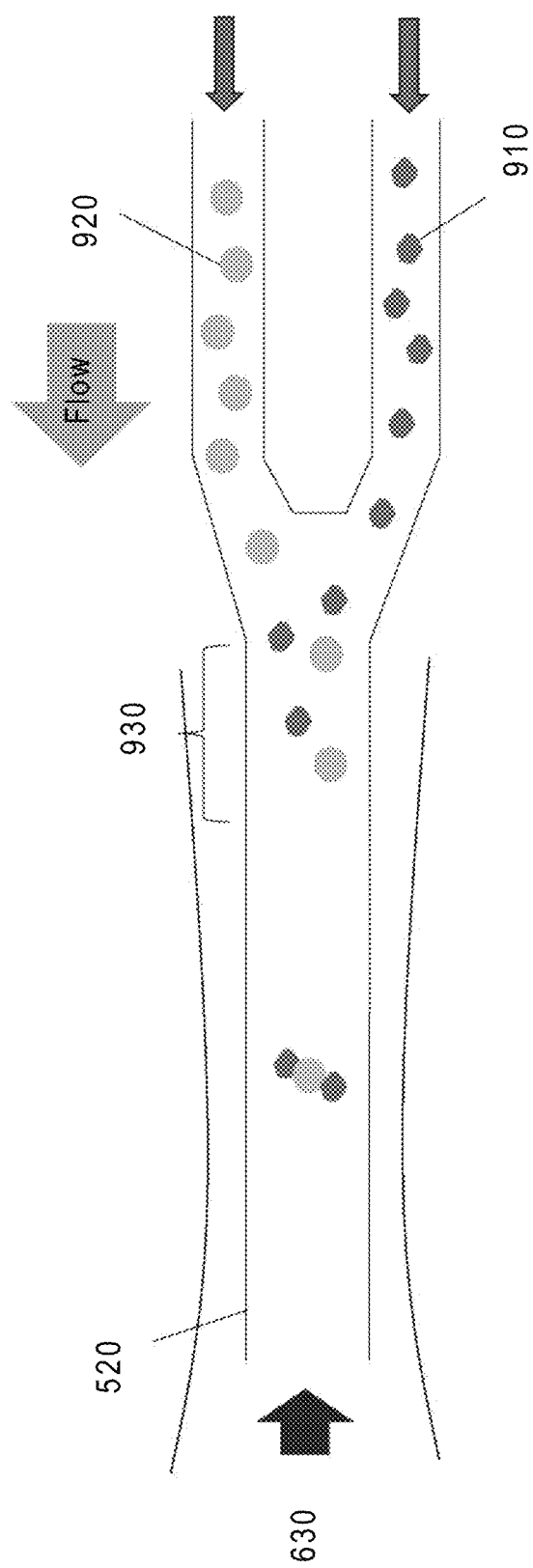

FIG. 13(A) Top View
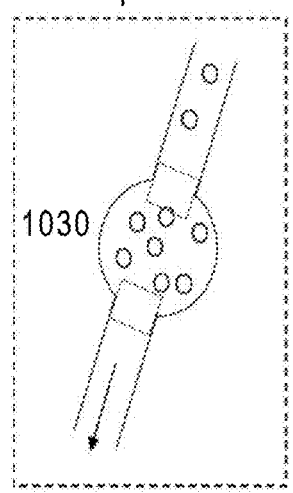
FIG. 13(B) Side View
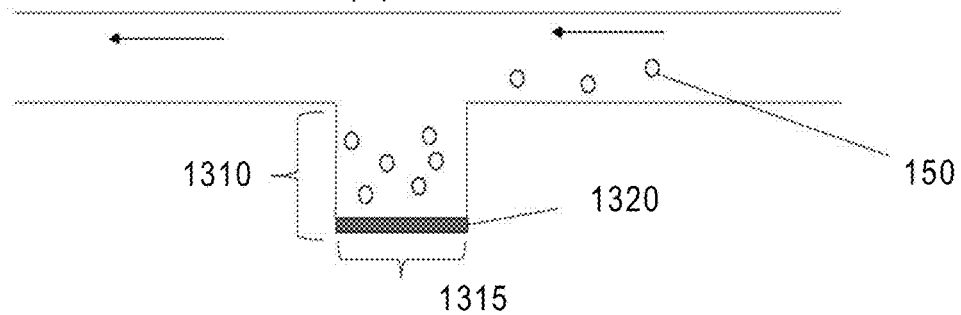
FIG. 13(C) Side View (weir)
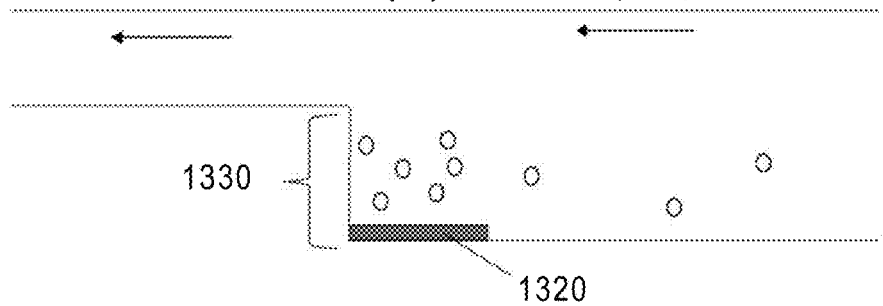
FIG. 13(D) Side View
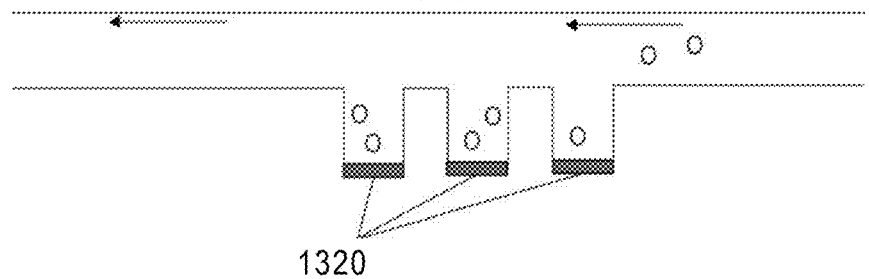

MICROFLUIDIC DEVICES AND METHOD FOR SAMPLING AND ANALYSIS OF CELLS USING OPTICAL FORCES AND RAMAN SPECTROSCOPY

CROSS-REFERENCE TO RELATED APPLICATIONS

This application claims priority to U.S. Provisional Patent Application Ser. No. 62/897,437 filed on Sep. 9, 2019, which is incorporated herein in its entirety.

FIELD OF THE INVENTION

Embodiments of the present disclosure relate to devices and methods of using the same that enable automated nano/micro/millifluidic sampling from one or more containers. The containers may comprise vessels ranging from one well or vial, to multiple multi-well plates. The devices provided herein are further capable of mixing the contents of individual wells, illuminating cell populations sampled in or from a well with light for spectroscopic purposes, microfluidically mixing or separating particulate or cellular samples using hydrodynamic, optical, acoustic, magnetic, or electrokinetic forces for analysis and monitoring of particle-based processes using optical force or Raman spectroscopy. The devices and methods described herein further comprise the use of Raman spectroscopy and optical and hydrodynamic forces combined with electrokinetic forces for analyzing and sorting cells.

DESCRIPTION OF THE RELATED ART

The increased use of automated systems for sample storage, handling, and analysis has led to extensive research in the field of automation. Current sampling systems consist of robotic arms capable of moving a sample from a storage to loading zone for sampling, magnetic or mechanical stir members capable of keeping samples in suspension, and heated or cooled zones capable of regulating sample storage or analysis temperatures.

Prior art devices include automated sampling apparatuses encompassing various fields of analytical research (e.g. U.S. Pat. No. 4,713,974 for use with liquid chromatography) but are not well suited for biological cellular analysis using Laser Force Cytology (LFC), Raman spectroscopy or other optical and/or hydrodynamic and/or electrokinetic force measurements such as cell manipulations including trapping and sorting due to lack of accurate and consistent nanoliter flow rate control, adequate sample mixing, and reliable temperature control for sample handling.

Wilhelm et al. U.S. Pat. No. 4,816,730 describes the use of an apparatus for handling and moving a plurality of objects consisting of a robotic arm capable of vertical, horizontal, and rotational movement with a gripper mechanism for holding samples driven by electronically controlled stepper motors. While Schmidt et al. U.S. Pat. No. 6,872,362 further describes the use of a powered autosampler having vial cup adapted to include a magnetic stir bar driven by a variety of different ways of changing the magnetic field around the vial cup. Although such prior art describes ways to move and mix a sample, these methods are not adequate for biological cellular analysis using LFC instrumentation. What is needed are improved devices that enable storage, mixing and sampling of vessels ranging from a single well to multiple multi-well plates while maintaining biological cellular integrity by adequate mixing and temperature maintenance through the use of pneumatic based non-contact mixing and a temperature-controlled single-well or multi-well plate blocks.

Automatic well plate stacking or retrieval systems that have robotic mechanisms are available that enable sequential stacking or retrieval vertically or horizontally (CN204136215U, US20040206419A1), utilize cassettes for loading and unloading (U.S. Pat. No. 9,744,535) or that describe whole-lot simultaneous stacking or retrieval of plates into a magazine or tower rack (U.S. Pat. No. 6,086,319). Further, previous designs enable the well plates to be loaded or removed from a storage tower in a random (non-sequential) manner irrespective of the order in which they are stacked (U.S. Pat. No. 7,670,555). What is needed however is the ability to achieve specific and automated detection, selection and stacking or retrieval of a desired well plate into or from a storage tower in a non-sequential manner utilizing magnetic interfaces and enabling well plate incubation which can be used in conjunction with multiplex analysis methods for automated sampling of such well plates.

What is also needed is the ability to characterize and analyze particles, such as biological cells, in a way that provides meaningful information for a range of applications. For example, what is needed, is the ability to analyze a fluid sample by precise assessment of the components therein. In certain embodiments, the ability to monitor and control fluid flow, such that the particles in the fluid can be sorted and then selectively positioned for assessment is desirable. In certain embodiments, the ability to sort particles in a fluid sample, orient the particles in an appropriate configuration to characterize their properties (i.e. internal organelles, surface proteins, receptors, nuclear changes, or other biophysical or biochemical markers etc.) would contribute to the development of personalized medicine such as gene or cell therapy. In other embodiments, the ability to bring cells or particles in contact with each other (in the presence or absence of chemicals/biochemical) for the purpose of characterizing and quantitating the interaction (binding affinity, cellular killing capacity, or other interaction) would be valuable. Furthermore, accurate particle characterization is also important for the development and design of novel biologics or cell or gene therapy products. Specifically, the label-free measurements of the interaction between target cells, such as cancer cells (cell lines or primary cells) and effector cells, such as engineered T cells (CAR-T, TCR, etc.) or any other cancer destroying cell therapy product would be an important step towards replacing inadequate co-culture cell killing assays based upon imaging or staining (antibody-based or other types). What is needed therefore, is a device that enables improved characterization and profiling of particles such as cells and other chemical and biological entities.

Within the cell-therapy manufacturing cycle, the measurement of intrinsic properties with Raman spectroscopy, and/or electrokinetic, and/or or optical forces could be valuable at several stages. Such characterization could be particularly relevant for the manufacturing of autologous CAR T cells. The first step is generally apheresis of a patient, during which the white blood cells must be extracted from the red blood cells and other components. Due to the varied history and individual nature of each patient, it is valuable to have an intrinsic measurement of the apheresis product, as this will be the starting material for the manufacturing process. This characterization could be done using Raman spectroscopy, and/or electrokinetic, and/or optical forces and once a sufficient amount of data has been accumulated, could be used to direct the manufacturing process or predict the chance of success. After apheresis, the cells are engineered, often with a viral vector such as a lentivirus or retrovirus, though other methods exist, such as transposons, zinc finger nucleases, or CRISPR. The engineering process, during which the patient cells are genetically modified, is often difficult to monitor and is thus another area in which Raman spectroscopy or optical forces could be valuable. After the cells have been engineered, they are expanded to provide a sufficient dose for the patient. This process can also be difficult to monitor and is in need of novel analytical tools in order to determine the optimal process conditions. As a result of the labile nature of T cells, the process can vary depending upon the patient and it is not always possible to use antibody labels to characterize the sample. Thus, this is another area where Raman spectroscopy or optical forces could be used to monitor the expansion step in order to optimize and ensure success of the process. Finally, the final product must be characterized in order to predict clinical success of the treatment. Currently, methods exist such as a co-culture killing assay or measurement of certain cytokines such as interleukin-2 (IL-2). Thus far, no specific key quality attributes have been determined that accurately predict clinical or biomanufacturing success. Thus, the measurement using Raman spectroscopy, and/or electrokinetic, and/or optical forces of the product cells, either alone or in concert with target cells provides another area of value. The product must also be tested for safety, including the absence of mycoplasma, bacteria, and viruses. Characterization either throughout the production process or of the final product with Raman spectroscopy, and/or electrokinetic, and/or optical forces could be used to test for each of these adventitious agents in a rapid and label-free way. Raman spectroscopy, and/or electrokinetic, and/or optical forces can also be used to measure the patients' response to a cell therapy or gene therapy treatment by collecting blood or biopsy samples and analyzing the cells for phenotypic changes due to the cell therapy.

In the area of gene therapy, wherein a patient's cells are altered for therapeutic effect, viral vectors such as adenovirus, adeno associated virus (AAV), or lentivirus are often used. For lentivirus and AAV, the production process often involves a transfection step, though AAV can also be made with a helper virus such as adenovirus, herpes simplex virus, or baculovirus. Once made, the viral particles can then be infected or transduced into the target cell type. Each of these process, transfection, infection, and transduction can be difficult to quantify and another area where measurement using Raman spectroscopy, and/or electrokinetic, and/or optical forces could be applied. Several additional application areas related to AAV in particular include the discrimination of empty vs full capsids, infectious vs non-infectious capsids, the physical titer, and the infectious titer.

Another aspect of cell therapy where the application of intrinsic measurements would be useful is in the research, development, production, and differentiation of stem cell products. As various methods, including media supplementation and genetic modification, can be used to differentiate or de-differentiate cells into various lineages, it is important to be able to characterize and monitor this process. Due to the heterogenous nature of these populations, the exact nature of the differentiation pathway followed by each cell could be slightly different, which could make it difficult to use traditional antibody or fluorescent based methods to characterize the cell populations, as it is unclear which cell types might be present. Thus, having an approach that is label free and measures intrinsic properties, such as Raman spectroscopy, and/or electrokinetic, and/or optical forces, would allow for the unbiased and flexible characterization and monitoring of these populations and processes. In addition, the degree to which a stem cell deforms can be biologically relevant and can be measured by the application of optical forces.

Measurement of at least one of the intrinsic (or extrinsic) property(ies) of particle and cellular samples comprising the use of Raman spectroscopy, and/or electrokinetic, and/or optical forces provides important information for subsequent analysis and utility of such particles and cellular samples. Information concerning such properties may be used for a range of applications, including but not limited to: determining the viral infectivity of a cell sample (the number of functionally infectious virus particles present in a particular cell population, similar to a plaque assay or end point dilution assay) for the purposes of viral quantification, process development and monitoring, sample release assays, adventitious agent testing, clinical diagnostics, biomarker discovery, determining the productivity of a cell in terms of antibody or protein for process development and monitoring, determining the efficacy, quality, or activation state of cells produced as a cell-based therapy or gene therapy, including CAR T and other oncology applications and stem cells, determining the effect of a chemical, bacteria, virus, antimicrobial or antiviral on a specific cell population, and determining the disease state or potential of a research or clinical cell sample.

What is needed therefore are devices, systems and methods of using the same that enable automated sampling and optical and/or hydrodymanic, and/or electrokinetic detection, analysis and/or manipulation from containers such as vials, wells or multiwell plates, and coordinate delivery of such samples to analytical regions for detection/characterization and processing.

SUMMARY OF THE INVENTION

Embodiments of the present disclosure relate to devices and methods of using the same that enable automated nano/micro/millifluidic sampling and analysis of particulate in fluids from vessels, wherein the vessels range from one well or vial, to multiple multi-well plates. Analysis and sorting of particulate samples (cells, bacteria, yeast, etc.) is accomplished using optical, electrokinetic, and hydrodynamic forces and/or Raman spectroscopy to move cells within microfluidic channels to accomplish analysis, sorting or isolation coupled with spectroscopic sensing, and detection through the use of Raman spectroscopy. More specifically, the novel devices and methods described herein accomplish fluidic manipulation for the purpose of cellular separation and analysis through the use of hydrodynamic, electrokinetic, and optical forces. Additional biochemical and biological data can be obtained using Raman spectroscopy measurements made on cells within microfluidic channels, well, weirs, or other structures that accumulate them or concentrate them for sensing purposes. In certain embodiments, the use of surface enhanced Raman (SERS) signals can be achieved by coating channel surfaces with noble metals (gold, silver, platinum, etc.) to enhance signal collection. Cells can be sensed either in groups or as individual cells to collected either bulk or single cell data.

BRIEF DESCRIPTION OF THE DRAWINGS

FIG. 9(A) provides a schematic showing an embodiment of microfluidic pathways wherein one or more populations of cells, particles, fragments, or molecules are combined prior to entering the interrogation region.

FIGS. 13(A) through 13(D) provides schematics showing an embodiment of microfluidic architecture showing collection wells or weirs within microfluidic channels for laser-based Raman analysis or other analysis. FIG. 13(A) shows a top view of a representative collection well or weir, FIG. 13(B) shows a side view of a representative collection well or weir configured to capture one or more cells, FIG. 13(C) shows a weir, in which cells are collected against a wall or other structure for analysis, and FIG. 13(D) shows an embodiment with multiple wells wherein the wells may be spaced in various configurations and optionally combined with one or more weir structures.

FIG. 14(A) provides an embodiment demonstrating the placement of a collimated light source (630) as focused on a representative collection well or weir, FIG. 14(B) shows a top view of a representative collection well or weir.

FIG. 15(A) provides an embodiment demonstrating where a laser or collimated light source (630) provides an optical force (1510) that can trap cells or particles (150) against a SERS coating or substrate (1500). FIG. 15(B) provides an embodiment demonstrating the incorporation of a well (1550) that physically captures and isolates the cells (150) after they are acted on by an optical force.

DETAILED DESCRIPTION

Figure 1:
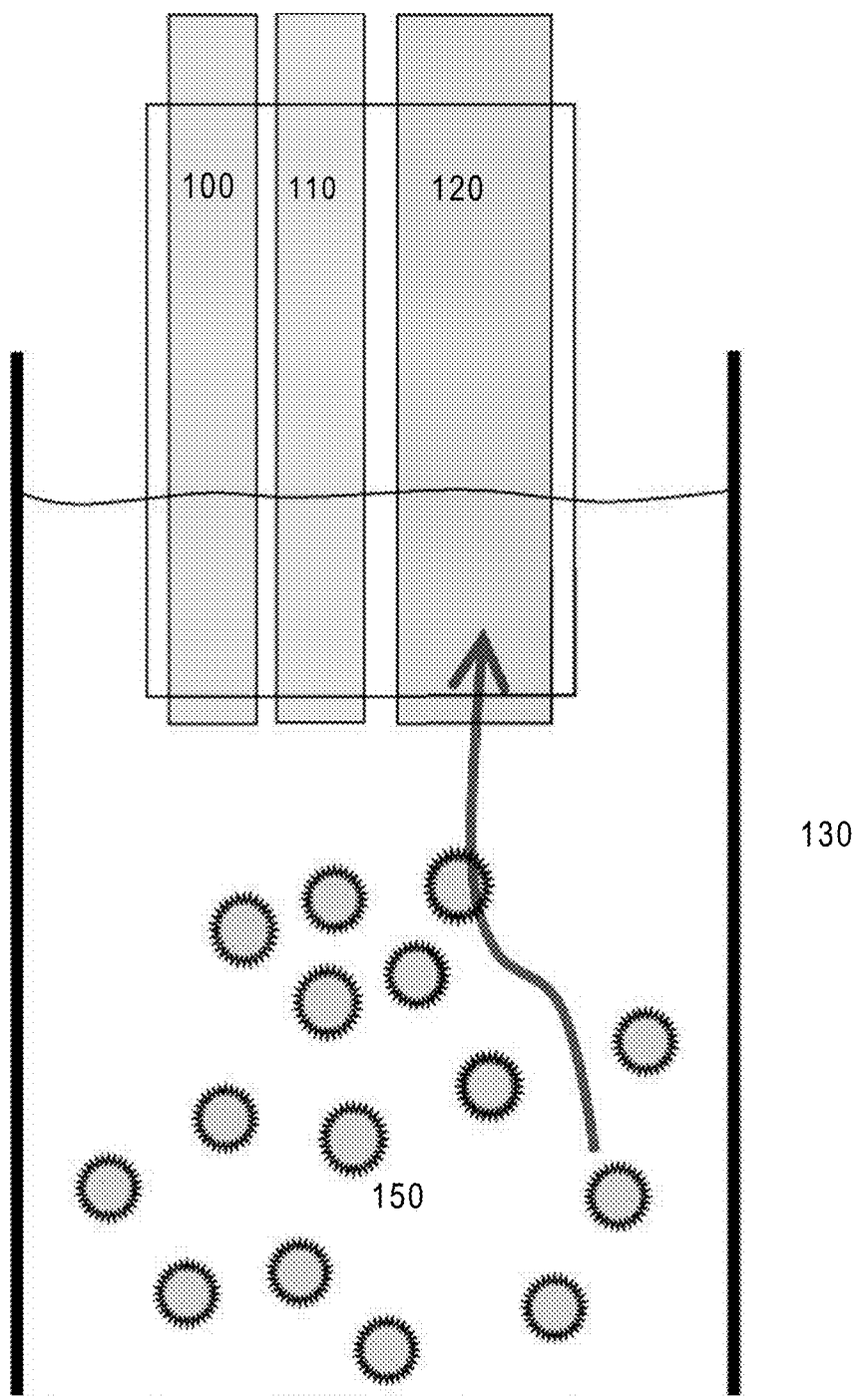
FIG. 1 provides a schematic of a probe, such as a fiber optic probe, and tube for sampling.

The present invention is described with reference to particular embodiments having various features. It will be apparent to those skilled in the art that various modifications and variations can be made in the practice of the present invention without departing from the scope or spirit of the invention. One skilled in the art will recognize that these features may be used singularly or in any combination based on the requirements and specifications of a given application or design. One skilled in the art will recognize that the systems and devices of embodiments of the invention can be used with any of the methods of the invention and that any methods of the invention can be performed using any of the systems and devices of the invention. Embodiments comprising various features may also consist of or consist essentially of those various features. Other embodiments of the invention will be apparent to those skilled in the art from consideration of the specification and practice of the invention. The description of the invention provided is merely exemplary in nature and, thus, variations that do not depart from the essence of the invention are intended to be within the scope of the invention.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Unless otherwise defined, all technical and scientific terms used herein have the same meaning as would be commonly understood or used by one of ordinary skill in the art encompassed by this technology and methodologies.

Texts and references mentioned herein are incorporated in their entirety, including U.S. Provisional Patent Application Ser. No. 62/654,335 filed on Apr. 7, 2018, and U.S. patent application Ser. No. 16/378,067 filed on Apr. 8, 2019.

Provided herein are novel devices for automating the analysis of samples, wherein the samples are present in vials, vessels, wells, multi-well plates and the like; also provided are methods for using such devices. The devices may be referred to herein as microfluidic devices and such devices may be used for the analysis of particulate samples wherein the samples consist of various particles, cells, biological and/or chemical entities. The microfluidic devices deliver the sample in an appropriate medium/configuration/vessel for analysis by fluidic based instruments or systems for liquid, particulates, or cells. Suitable fluidic based instruments for analysis may utilize Laser Force Cytology (LFC), or other means. In certain embodiments, the characterization of particles/cells is accomplished using a series of novel methods that combine hydrodynamic, optical, and electrokinetic forces with Raman spectroscopy. The range of applications can be subdivided into multiple categories, including but not limited to: (1) off-line Raman spectroscopy in a well or tube using a probe, (2) on-chip microfluidic Raman detection or separation of cells for subsequent Raman analysis, (3) electrokinetic, and/or optical sorting, and/or Raman spectroscopy of cells based upon intrinsic parameters without the use of labels, (4) the use of wells or weirs to isolate cells using optical, hydrodynamic or electrokinetic forces and Raman spectroscopy to measure biochemical properties of the cells, and (5) the use of metallic coatings to enhance Raman signal coupled with weirs, wells, or channels in a microfluidic device using hydrodynamic or optical forces.

In an embodiment, the microfluidic devices as described herein may further comprise a dual fiber optic probe. For example, as shown in FIG. 1 a dual fiber optic probe and fluidic tube (120) for sampling particle containing fluids from a vessel (130) may be incorporated into an instrument for the purpose of making spectroscopic measurements at the point of sampling. In certain embodiments, the probe is made up of fiber optics (100, 110) for both delivery of the excitation light and collection of the Raman signal. The probe may also be made up of other materials suitable for the intended purpose. The integrated sampling tube (120) allows for the introduction of cells or particles (150) into an instrument. The probe, well plate, or both can be translated in one to three dimensions in order to facilitate automated sampling. In certain embodiments, the base of the vessel may be SERS active to enhance or enable Raman signal capability.

Figure 2:
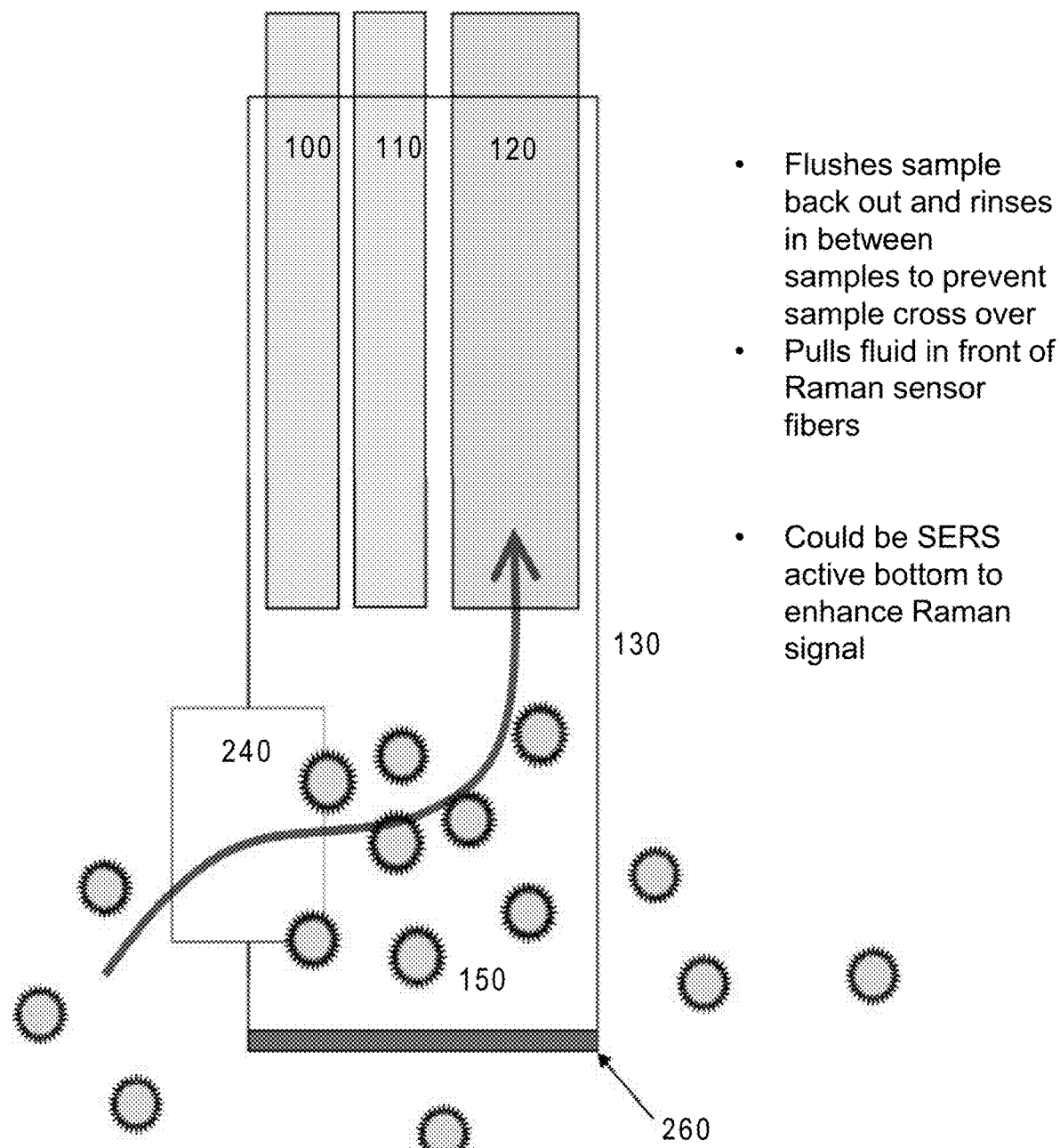
FIG. 2 provides a schematic of a fiber optic probe and microfluidic sampling system.

In an embodiment as shown in FIG. 2 a dual fiber optic probe and microfluidic sampling tube with an enclosure (240) is provided to allow interaction of cells or particles (150) with a SERS or other Raman active surface to enhance Raman signal (260). This is used for making Raman measurements on a per sample basis and done simultaneously with introduction of samples into another device. As needed, fluid can be flushed in front of the Raman or other sensor fibers, to rinse in between samples to prevent sample cross over.

Figure 3:
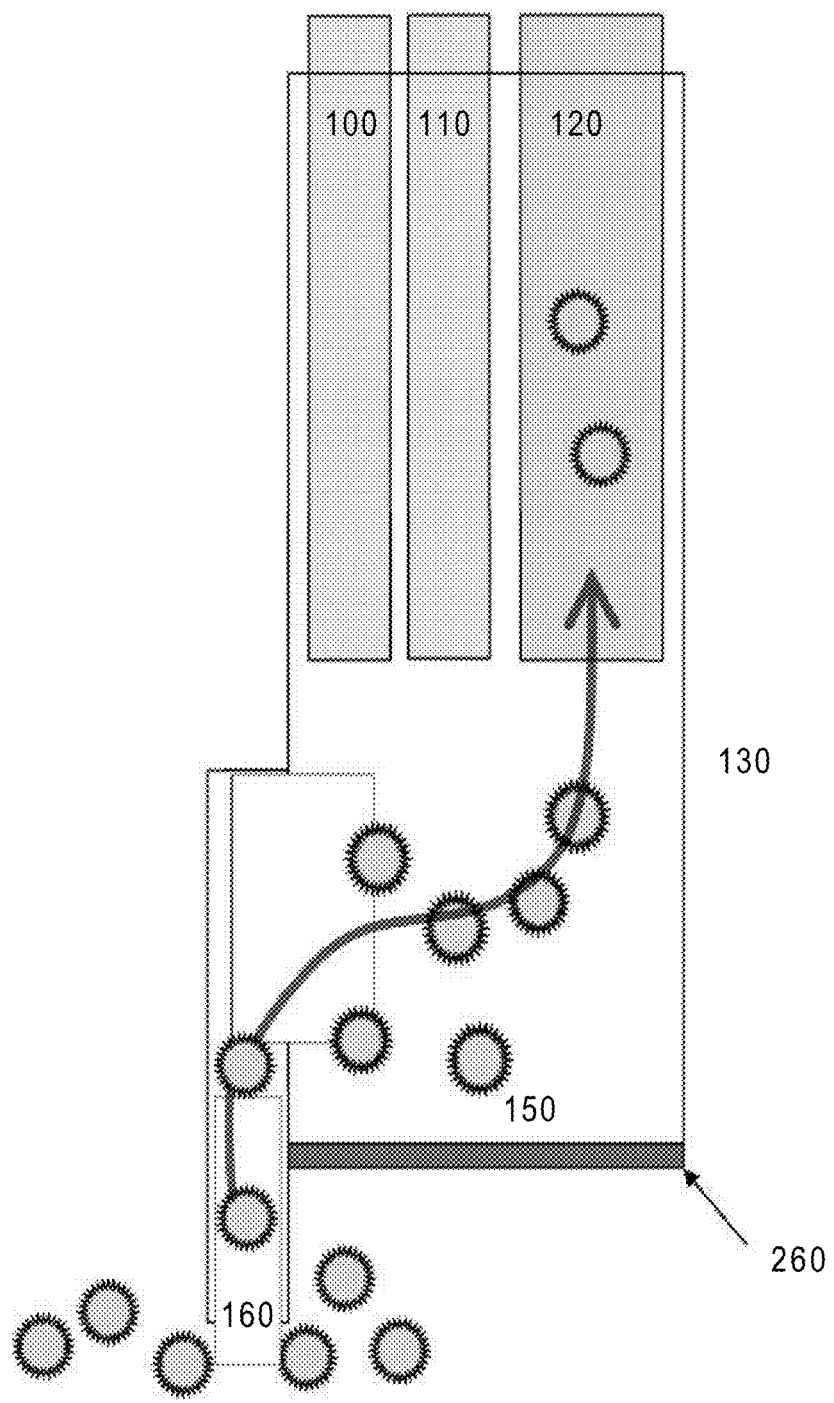
FIG. 3 provides a schematic of a fiber optic probe and microfluidic sampling system with integrated tip for sampling from small wells.

A fiber optic probe and microfluidic sampling system with integrated tip (160) for sampling from small wells or tubes is shown in FIG. 3. As needed, fluid can be flushed in front of the Raman or other sensor fibers, to rinse in between samples to prevent sample cross over. A SERS or other Raman active surface may optionally be included to enhance Raman signal (260). By using the sampling tip, this device enables access to higher density well plates with smaller wells. The tip may be made from any suitable material including, but not limited to polymer, plastic, glass, metal, or composite material. The size and dimension of the sampling tip may be customized according to the application and may be produced by methods known to those skilled in the art, such as by 3D printing.

Figure 4:
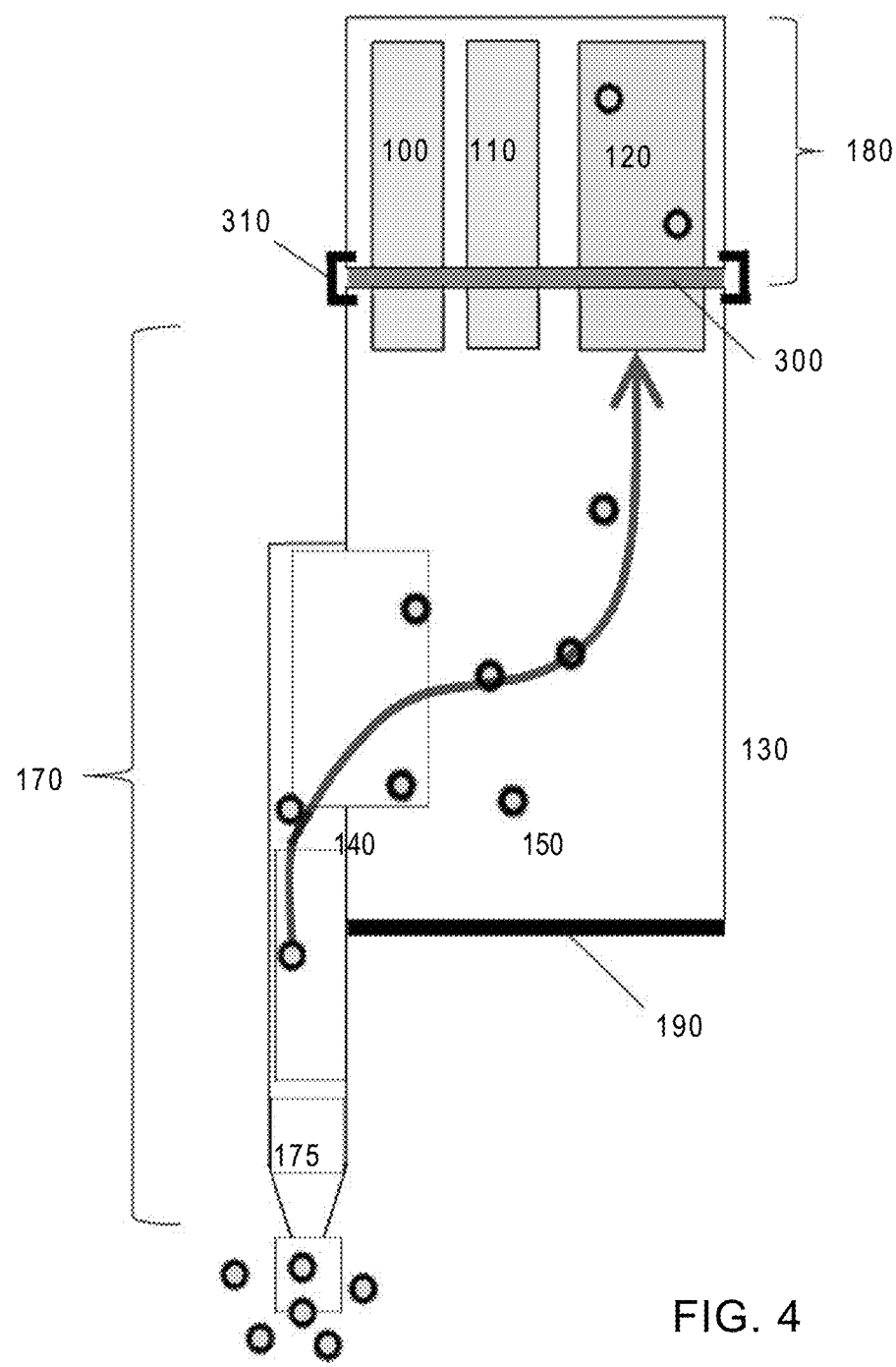
FIG. 4 provides a schematic of a fiber optic probe containing a removable/detachable reusable system tip for the fiber optic probe and microfluidic sampling system.

FIG. 4 provides an additional embodiment the invention wherein a removable/detachable reusable system tip (170) for the fiber optic probe and microfluidic sampling system of FIG. 3 is depicted. The glass (or other material) tip attaches to a metal Raman probe housing (180), which could be metal, plastic, or another material, with a band or clamp (310) holding a seal or gasket (300) in between them for seal in fluid. In an alternate embodiment, the tip (170) is attached to the housing (180) via a magnet or electromagnet. The probe tip (175) may be replaceable, and a laser light sensor could optionally be used to check for probe integrity. In an alternate embodiment, the bottom (190) is optically opaque or dark in order to prevent fluorescence from the well plate bottom.

Figure 5A:
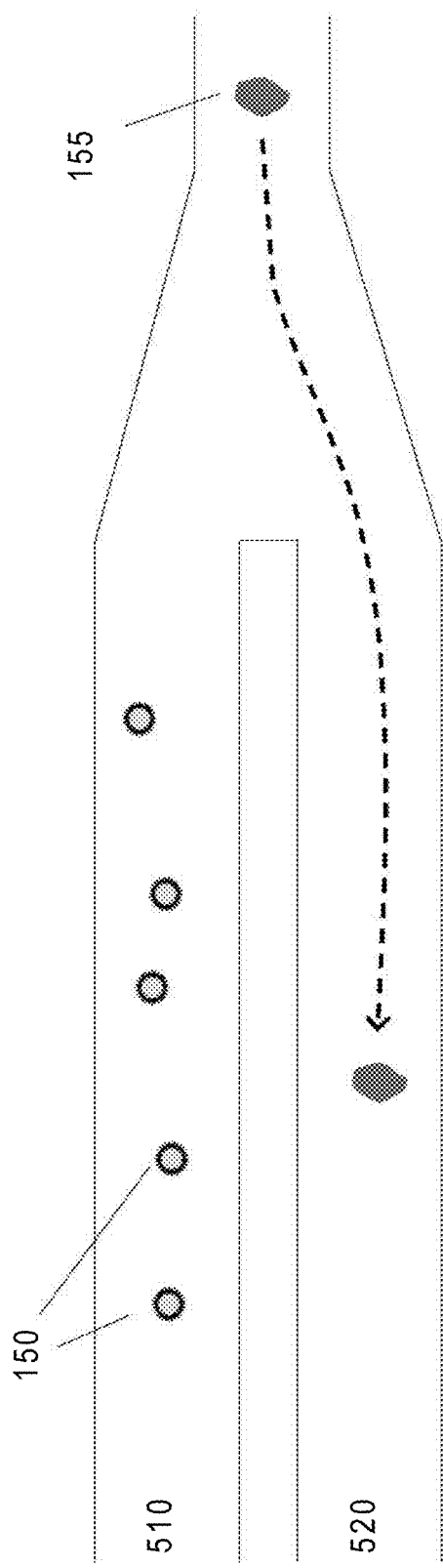
FIG. 5(A) provides a schematic showing an embodiment of microfluidic pathways for partitioning of cells, particles, fragments, or molecules.
Figure 5B:
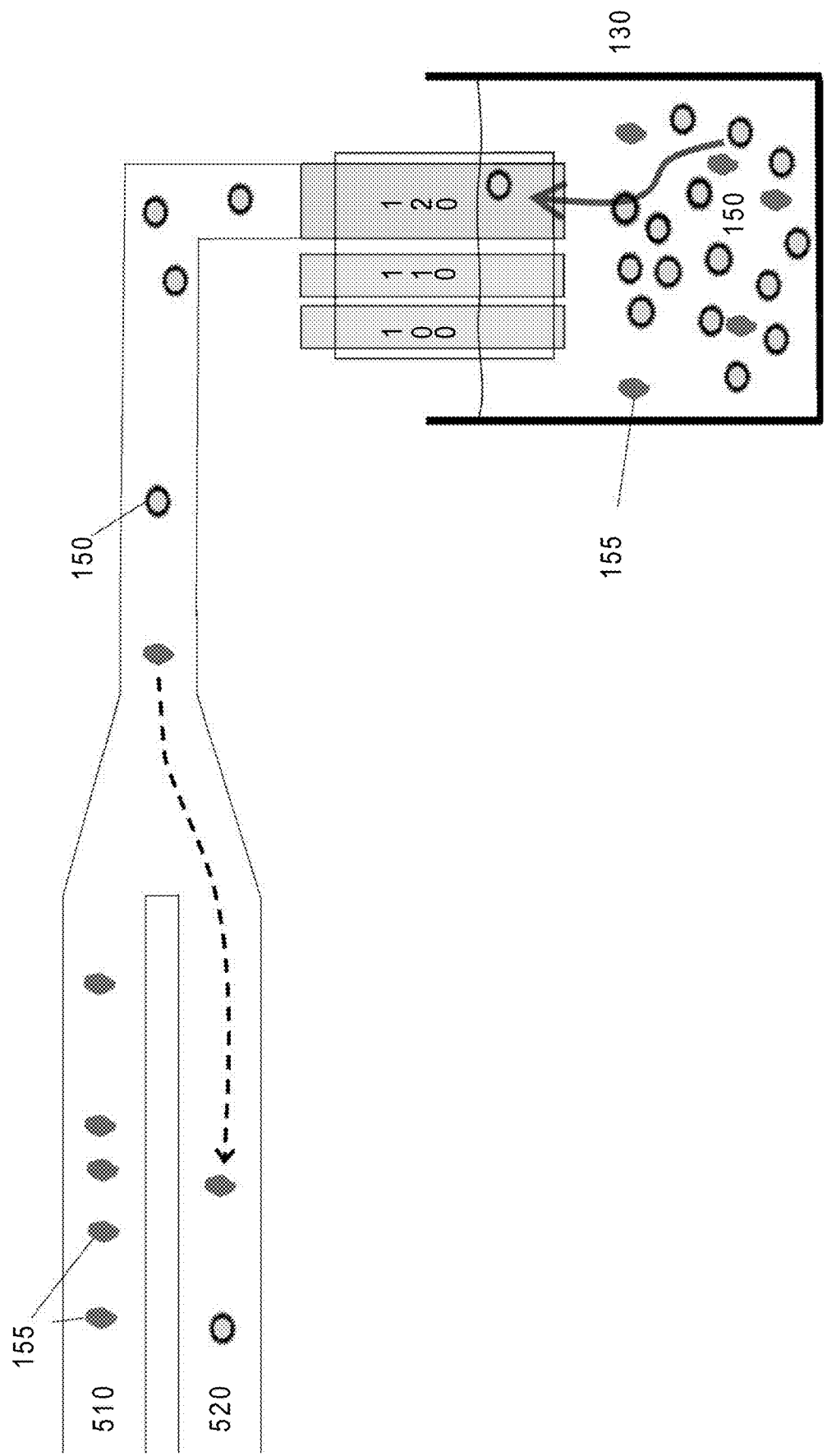
FIG. 5(B) provides a schematic showing an embodiment of microfluidic pathways for partitioning of cells, particles, fragments, or molecules connected to a fiber optic probe sampling system FIG. 6 provides a schematic showing an embodiment of microfluidic pathways for partitioning of cells, particles, fragments, or molecules for optical force and cellular interaction analysis.

FIG. 5(A) provides an embodiment wherein one or more pathways of the microfluidic device, such as an autosampler, may be designed for partitioning of cells, particles, fragments, or molecules by having a bifurcation in the microfluidic channel network. Such a network could be placed fluidically downstream of any of the probe systems described in FIGS. 1-4 or could be a standalone device. By varying flow rates or pressures between the two channels or using some other means, such as optical, electrokinetic, or acoustic forces, control over the direction of a particle or cell (150) may be obtained by directing it to either the waste channel (510) or analysis channel (520). Cells could be directed into the analysis region based on property or type. For example, FIG. 5(A) shows a second cell type (155) within the population that is preferentially directed to the analysis region. FIG. 5(B) shows one embodiment of the connection between fiber optic probe sampling systems, such as the ones described in FIGS. 1-4, and a system of bifurcated channels such as the one shown in FIG. 5(A). In this embodiment, the sample is made up of a mixed population of cells (150) and (155). Some from each population may be directed to the analysis region, depending upon their properties.

Figure 6:
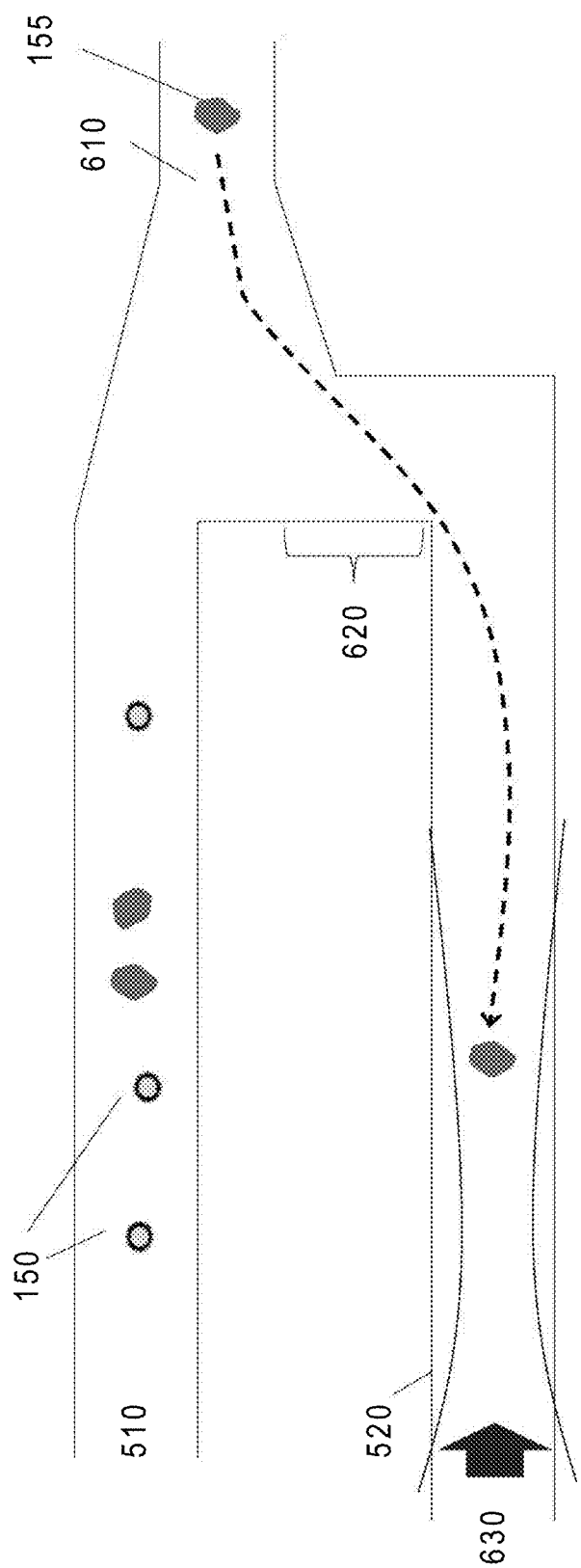

FIG. 6 shows how the selective analysis of certain cells or particles (150) or (155) can be achieved by directing cells into a dedicated analysis channel (520) in the microfluidic devices versus a waste channel (510). In one embodiment, the flow is changed to shift cells into analysis channel with fluid pressure controlled via a feedback loop based upon optical imaging of the cells as they enter the channel structure. Other embodiments may use other forces such as optical, magnetic, electrokinetic or acoustic to direct cells to the analysis channel or trap them in the analysis channel for interrogation. Optical force based methods may include the use of optical tweezers to hold cells, dual laser beams or a cell trapped between flow and mildly focused laser beam (laser force cytology). In one embodiment a collimated light source (630) is shown focused into the analysis channel (520). Based upon the needs of the analysis, there may be a large distance or offset (620) between the entrance to the bifurcation (610) and the analysis channel (520). This is to prevent the laser or other source of a force on cells to affect cells that do not enter the analysis channel.

Figure 7:
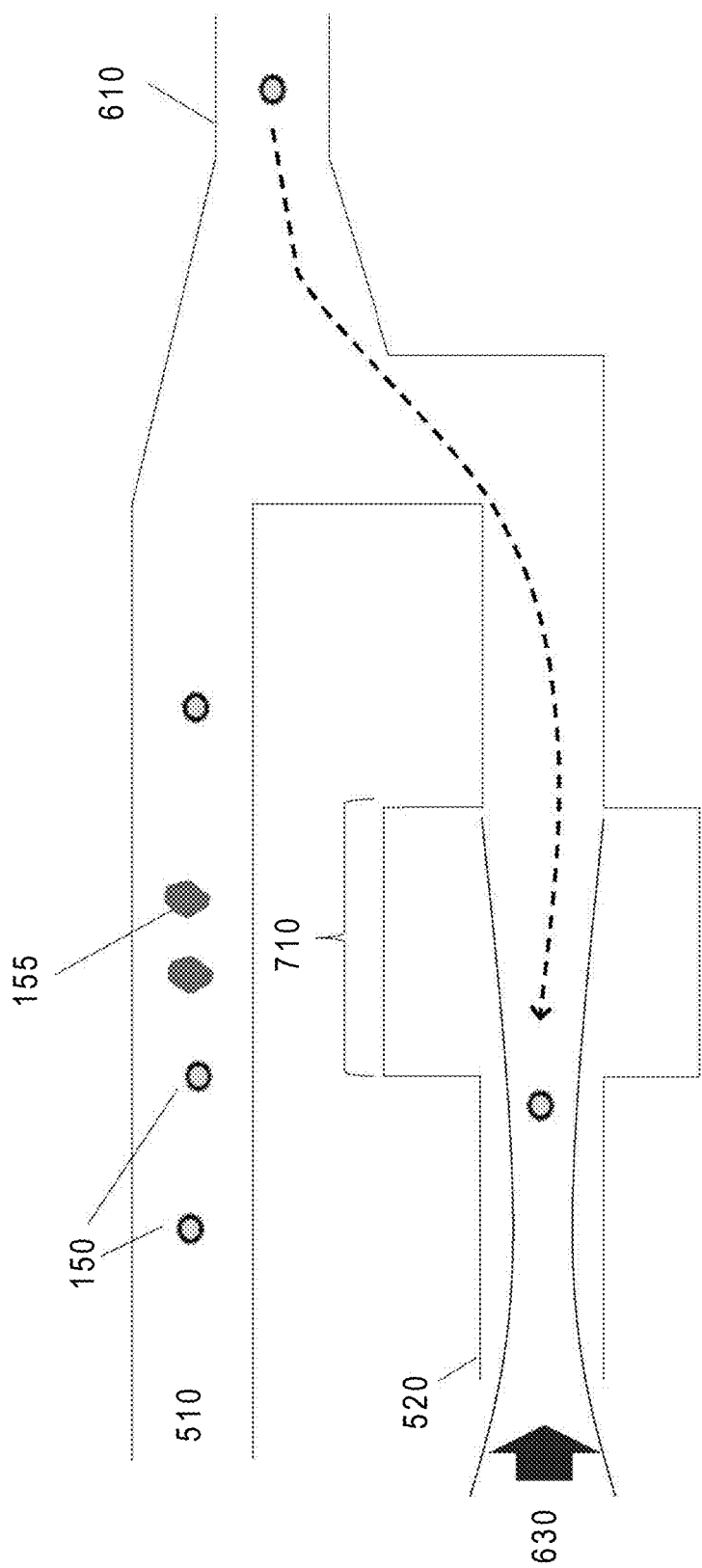
FIG. 7 provides a schematic showing an embodiment of microfluidic pathways for partitioning of cells, particles, fragments, or molecules for optical force or interaction analysis incorporating a large diameter channel or channel region. In this embodiment, an example is provided for an analysis region wherein Raman spectroscopy may be used to obtain relevant measurements and information about the particles of interest in the sample.

Microfluidic pathways for partitioning of cells, particles, fragments, or molecules for optical force or interaction analysis in an embodiment incorporating a larger diameter channel or channel region is depicted in FIG. 7. This larger region (710) reduces the fluid velocity in order to facilitate trapping and an increased residence time for analysis. This analysis may include, for example, Raman spectroscopy, fluorescence, or other measurements.

Figure 8:
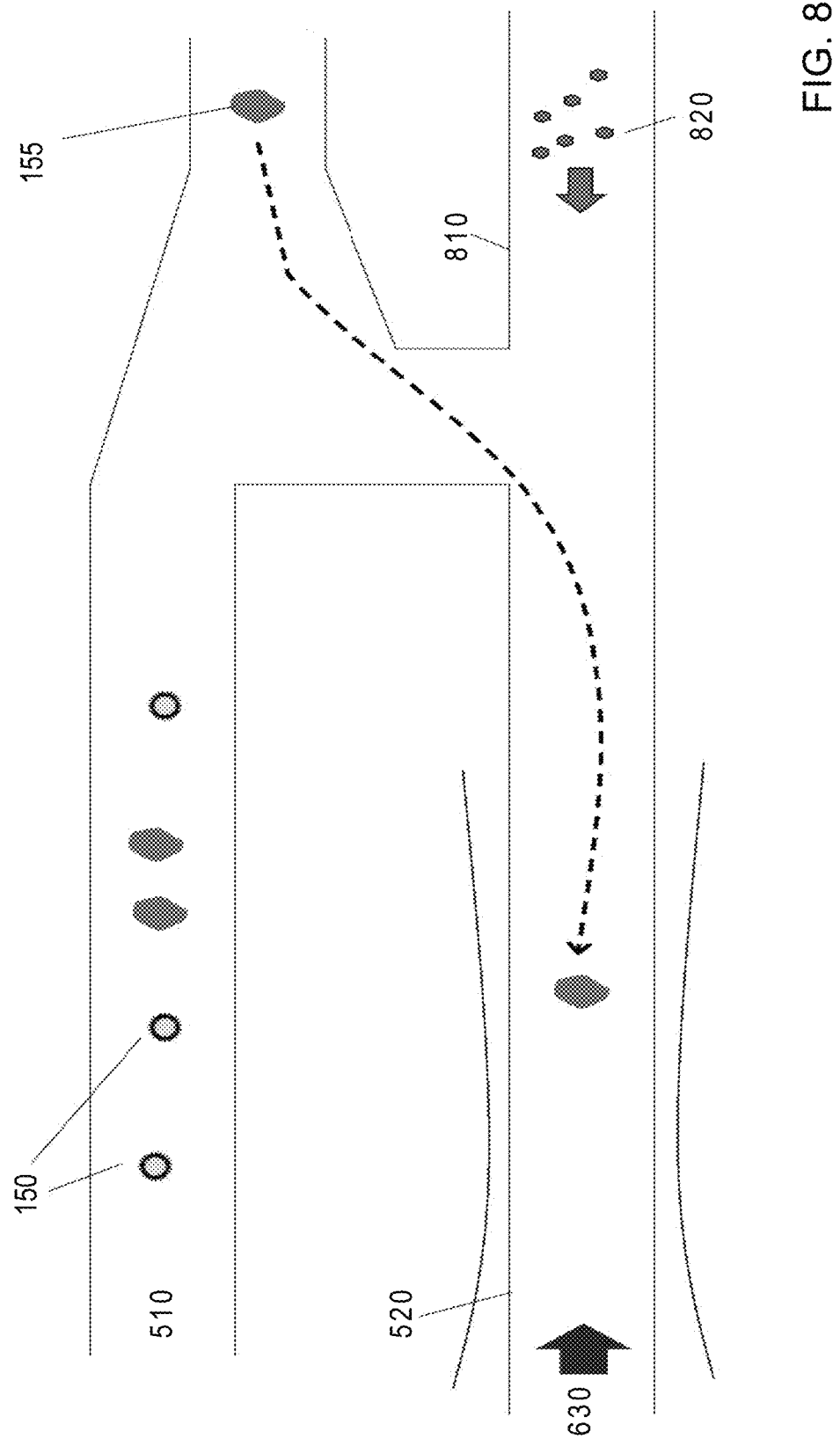
FIG. 8 provides a schematic showing an embodiment of microfluidic pathways for partitioning of cells, particles, fragments, or molecules for optical force or Raman analysis and subsequent introduction of biochemical and/or other cells for interaction measurement.

The addition of molecules, viruses, exosomes, cells, or other materials can be achieved by having a separate channel (810) for introduction (FIG. 8). This could be a single analysis channel with a single input, or multiple analysis channels with a single or multiple inputs for introduction of other materials. Optical force and hydrodynamically trapped cells can experience injected chemicals, biochemicals, bacteria, viruses, exosomes, cells, or other materials (820) in a controlled fashion.

Figure 9B:
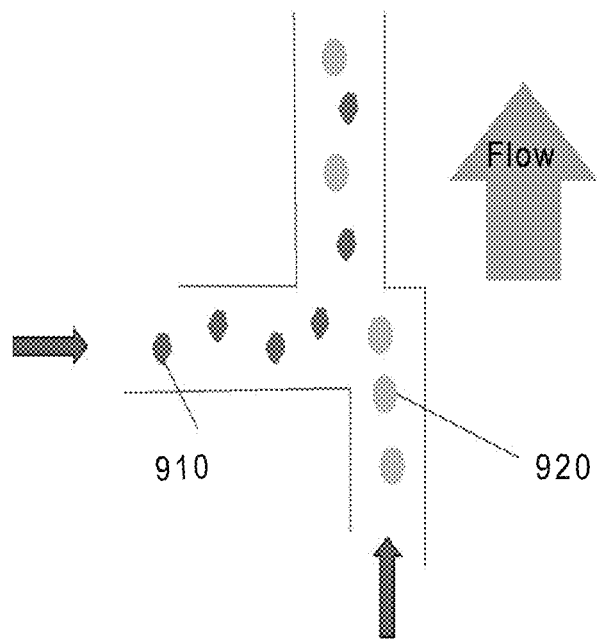
FIG. 9(B) provides a schematic showing an embodiment of microfluidic pathways wherein one or more populations of cells, particles, fragments, or molecules are combined prior to entering the interrogation region using a T-shaped junction.
Figure 9C:
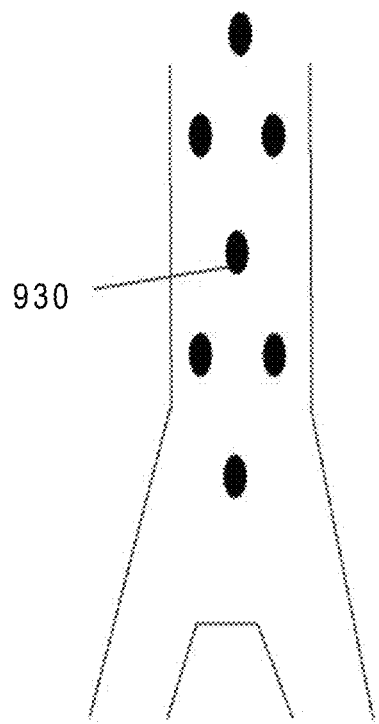
FIG. 9(C) provides a schematic showing an embodiment of microfluidic pathways wherein one or more populations of cells, particles, fragments, or molecules are combined prior to entering the interrogation region using pillars within the channel to control the flow regime and interaction.

Another approach for creating and measuring cellular interactions is to mix samples prior to analysis (FIGS. 9(A)-9(C)). In one embodiment, samples flowing from vessel 1 (910) and samples flowing from vessel 2 (920) may be combined. Prior to analysis, the samples will travel through an interaction region (930). The samples may or may not chemically or biologically interact or combine. The distance the mixed population travels prior to analysis may be customized in order to achieve a precise analysis time. This could also be achieved by adjusting the flow rate over a fixed distance. In addition, the residence time the cells or particles interact prior to analysis could be controlled by fluidic, optical, electrokinetic, or magnetic forces. The channel structure could be oriented horizontally, vertically, or at an angle with respect to gravity. By incorporating a T or Y junction prior to the analysis region, interaction can be controlled. One embodiment depicting a T-junction is shown in FIG. 9(B). Shapes or other features could also be employed to facilitate or improve the interaction between the two different samples or populations. One embodiment is shown in FIG. 9(C), wherein an array of posts (930) is present within the channel to control the interaction between any cells or particles introduced into the channel.

Figure 10:
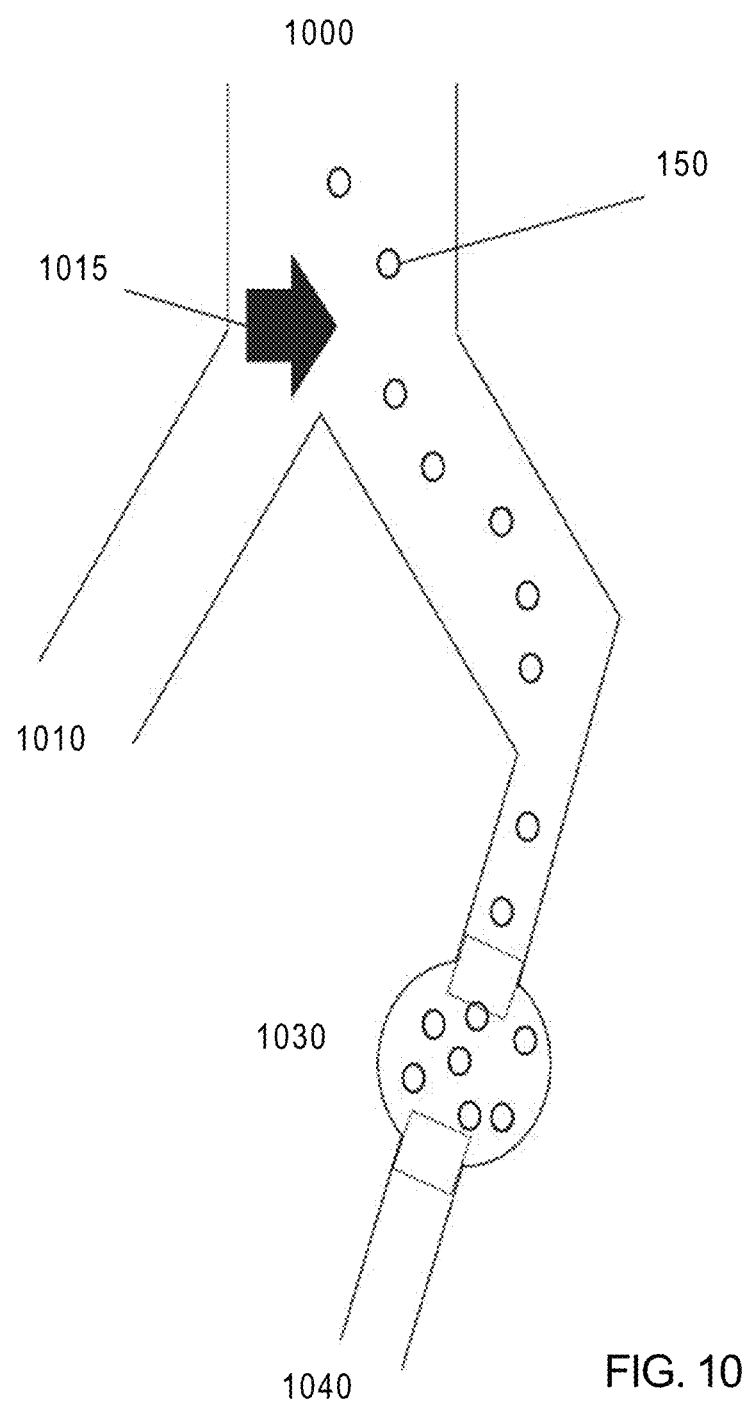
FIG. 10 provides a schematic showing an embodiment of microfluidic architecture showing a Raman collection well within microfluidic channels for sorting and accumulation of cells for Raman analysis.

FIG. 10 provides an embodiment of a microfluidic architecture with a collection well or analysis region (1030) within the microfluidic channels for sorting and accumulation of cells or particles (150) for Raman or other spectroscopic analysis. Cells can either be directed to the waste channel (1010) or collected within the analysis region (1030) using fluidic, optical, magnetic, electrokinetic or acoustic forces (1015). After analysis, cells or particles could then be directed to exit the device via channel (1040).

Figure 11:
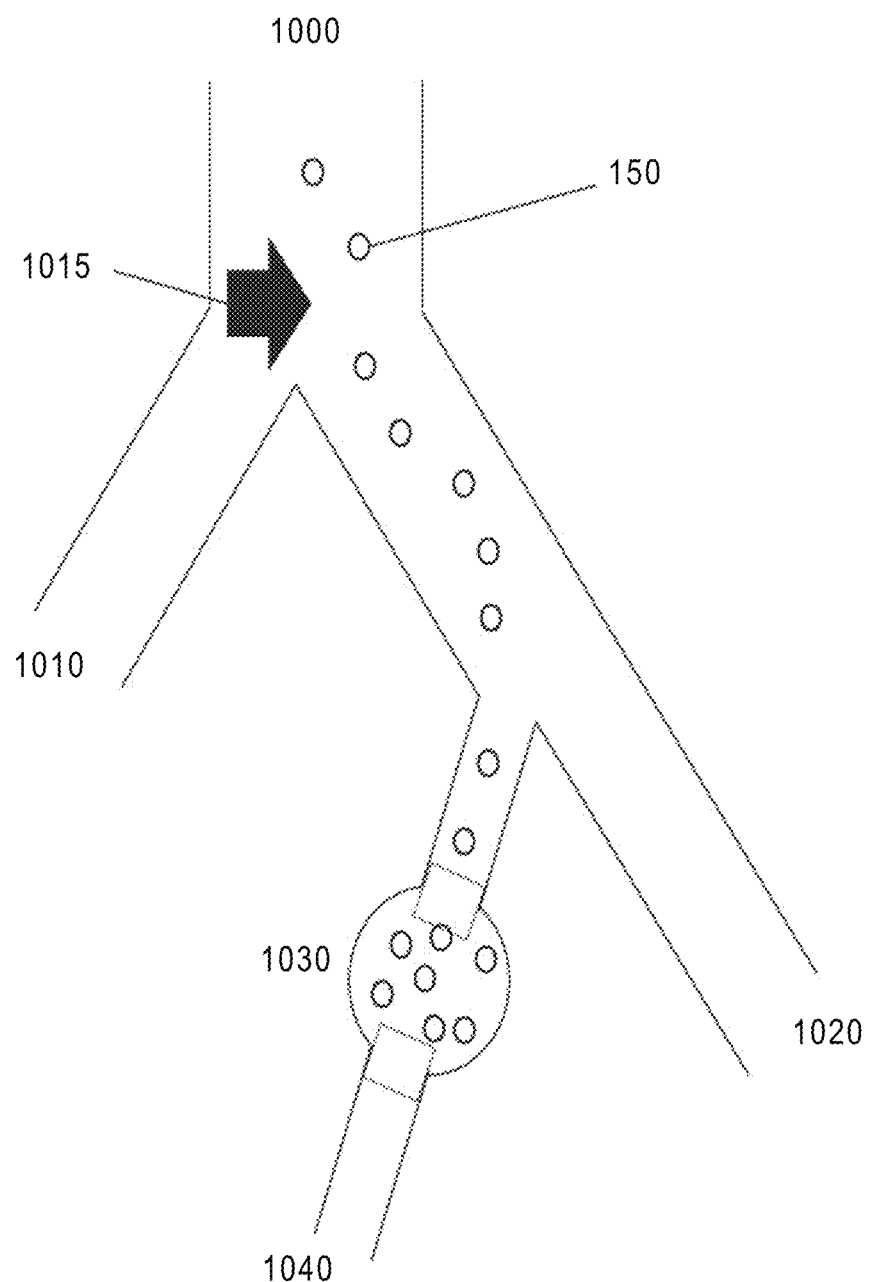
FIG. 11 provides a schematic showing an embodiment of microfluidic architecture showing a Raman collection well within microfluidic channels for accumulation of cells for Raman analysis with two waste or relief channels for splitting.

FIG. 11 provides microfluidic architecture from FIG. 10 showing collection the well or region (1030) within microfluidic channels for accumulation of cells for Raman or other analysis with an additional waste or relief channel (1020) for splitting prior to analysis.

Figure 12:
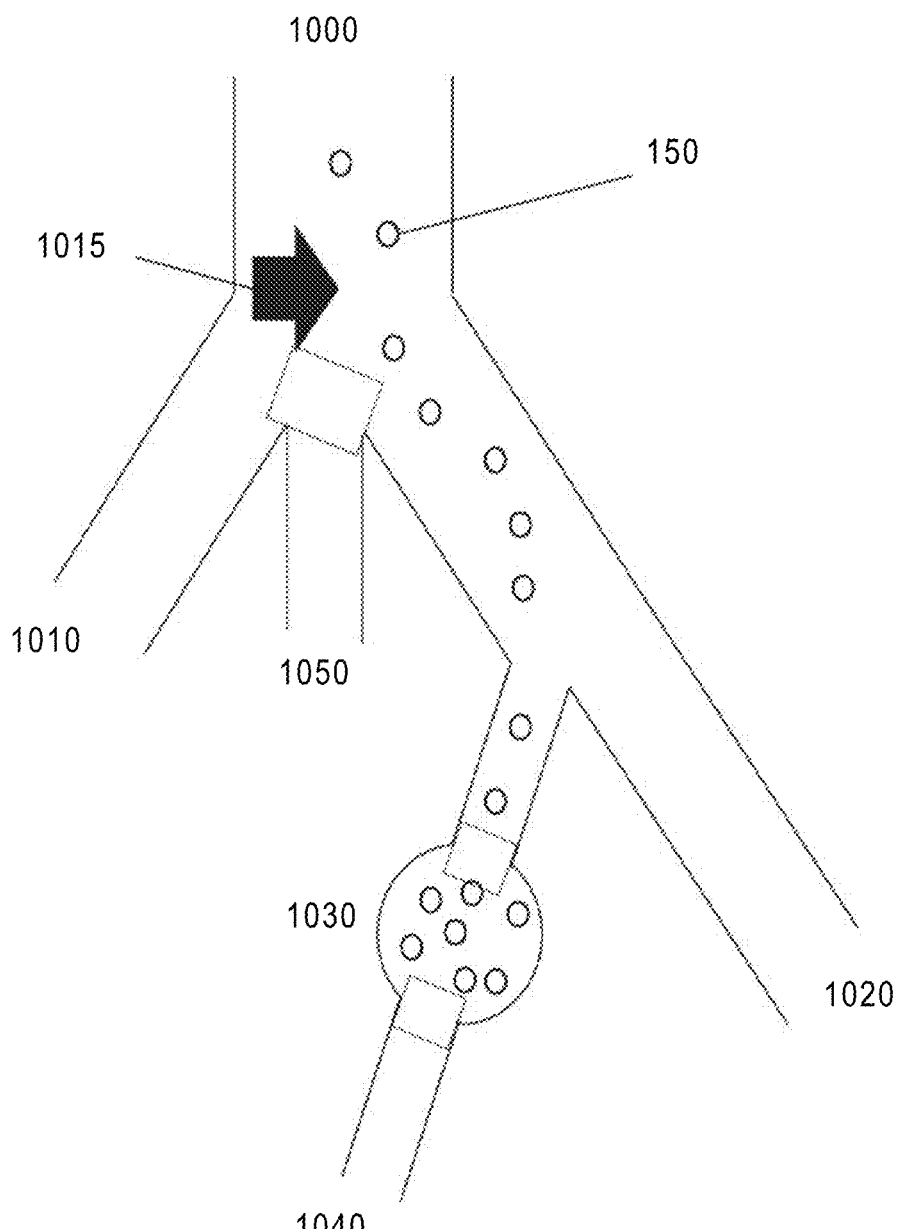
FIG. 12 provides a schematic showing an embodiment of microfluidic architecture showing Raman collection well within microfluidic channels for accumulation of cells for Raman analysis with three waste or relief channels for splitting flow to enable flow or no flow in the Raman collection well (1030) and channel (1040).

FIG. 12 provides microfluidic architecture from FIG. 11 showing collection well or region (1030) within microfluidic channels for accumulation of cells for Raman analysis with additional two waste or relief channels (1020 and 1050) for splitting flow to enable flow or no flow in the Raman collection well (1030) and channel (1040).

Shown in FIGS. 13(A) through 13(D) are microfluidic architectures showing sample collection wells or weirs within microfluidic channels for laser-based Raman or other spectroscopic analysis. FIG. 13(A) shows the top view of one embodiment of a well, though the shape could be circular (as shown), rectangular, elliptical, or polygonal. Several embodiments are shown. In FIG. 13(B), a well is used to capture one or more cells. The depth (1310) and width (1315) of the well can be adjusted in order to fine tune its behavior, including the number and type of cells (150) that are collected. The bottom of the well can include an electrode or SERS material (1320) to facilitate Raman or other spectroscopic analysis. FIG. 13(C) shows a weir, in which cells are collected against a wall or other structure for analysis. The height of the weir (1330) can be adjusted, and the weir area could also contain an electrode or SERS material (1320) similar to the well. FIG. 13(D) shows an embodiment with multiple wells. These wells could be spaced in various configurations and could be combined with one or more weir structures. Multiple weir structures could also be used on their own in order to create several regions of collection or analysis. In each embodiment, fluidic, optical, magnetic, electrokinetic or acoustic forces could be used to assist in the collection or release of cells detained in the structures.

Figure 14A:
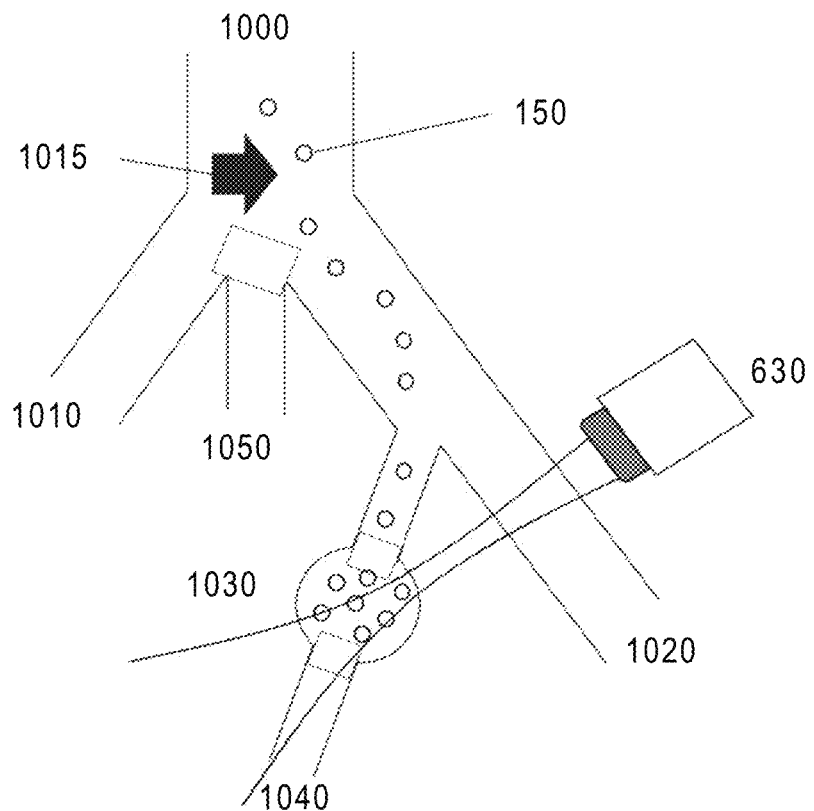
FIGS. 14(A) and 14(B) provides schematics showing an embodiment demonstrating a configuration for trapping cells or cell populations and using fluidic, optical, or electrokinetic forces for analysis.
Figure 14B:
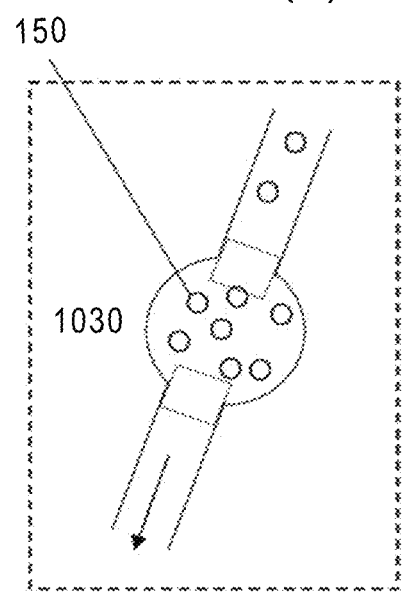

FIGS. 14(A) and 14(B) provide embodiments for trapping particles, cells or cell populations in (1030) using fluidic, optical, magnetic, electrokinetic or acoustic forces for Raman or other spectroscopic analysis. One embodiment is shown in FIG. 14(A), wherein a collimated light source (630) is used to impart optical forces to trap cells or particles (150) within the Raman analysis well (1030). Another embodiment is shown in FIG. 14(B) that uses electrokinetic forces to trap cells or particles within the Raman analysis well (1030).

Figure 15A:
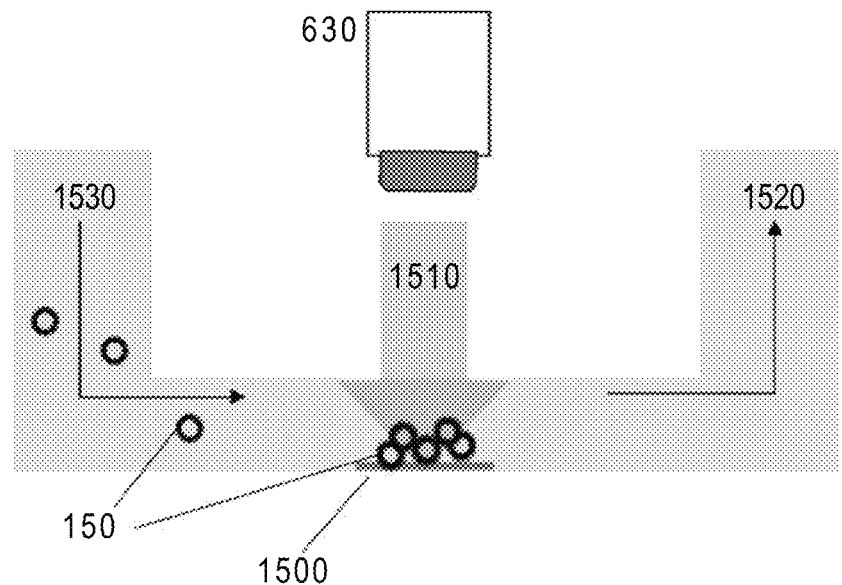
FIGS. 15(A) and 15(B) provides schematics showing integration of optical forces, Raman detection with a microfluidic SERS substrate for surfaces, well, and weirs.
Figure 15B:
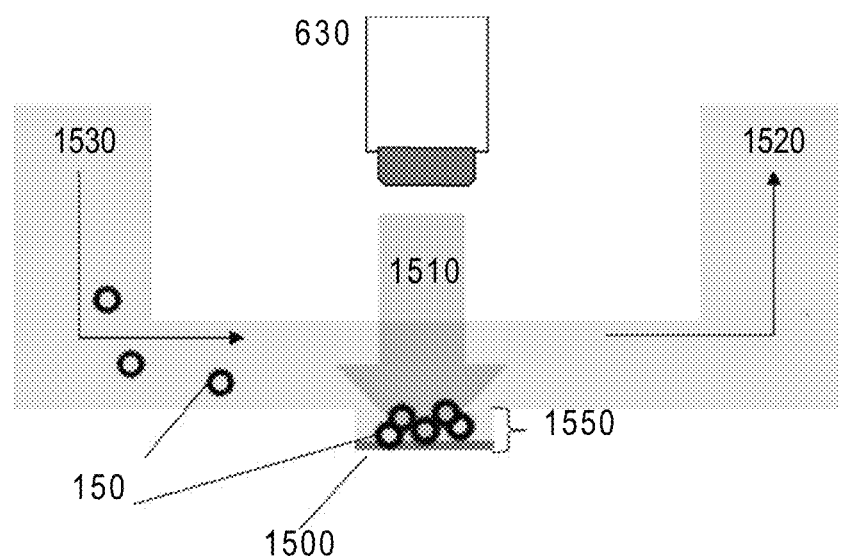

FIGS. 15(A) and 15(B) provides schematics demonstrating the integration of optical forces, Raman detection with a microfluidic SERS substrate for surfaces, well, and weirs of FIGS. 13 and 14. Optical forces can be used to trap the cells or particles against the SERS coating or substrate in order to facilitate analysis. One embodiment is shown in FIG. 15(A), where a laser or collimated light source (630) provides an optical force (1510) that can trap cells or particles (150) against a SERS coating or substrate (1500), which is then analyzed using Raman spectroscopy. Fluid flows from the entrance (1530) of the channel or network of channels (for example as described in FIGS. 13 and 14), to the exit (1520). FIG. 15(B) shows an embodiment with a well (1550) that physically captures and isolates the cells (150) after they are acted on by the optical force (1510).

Figure 16:
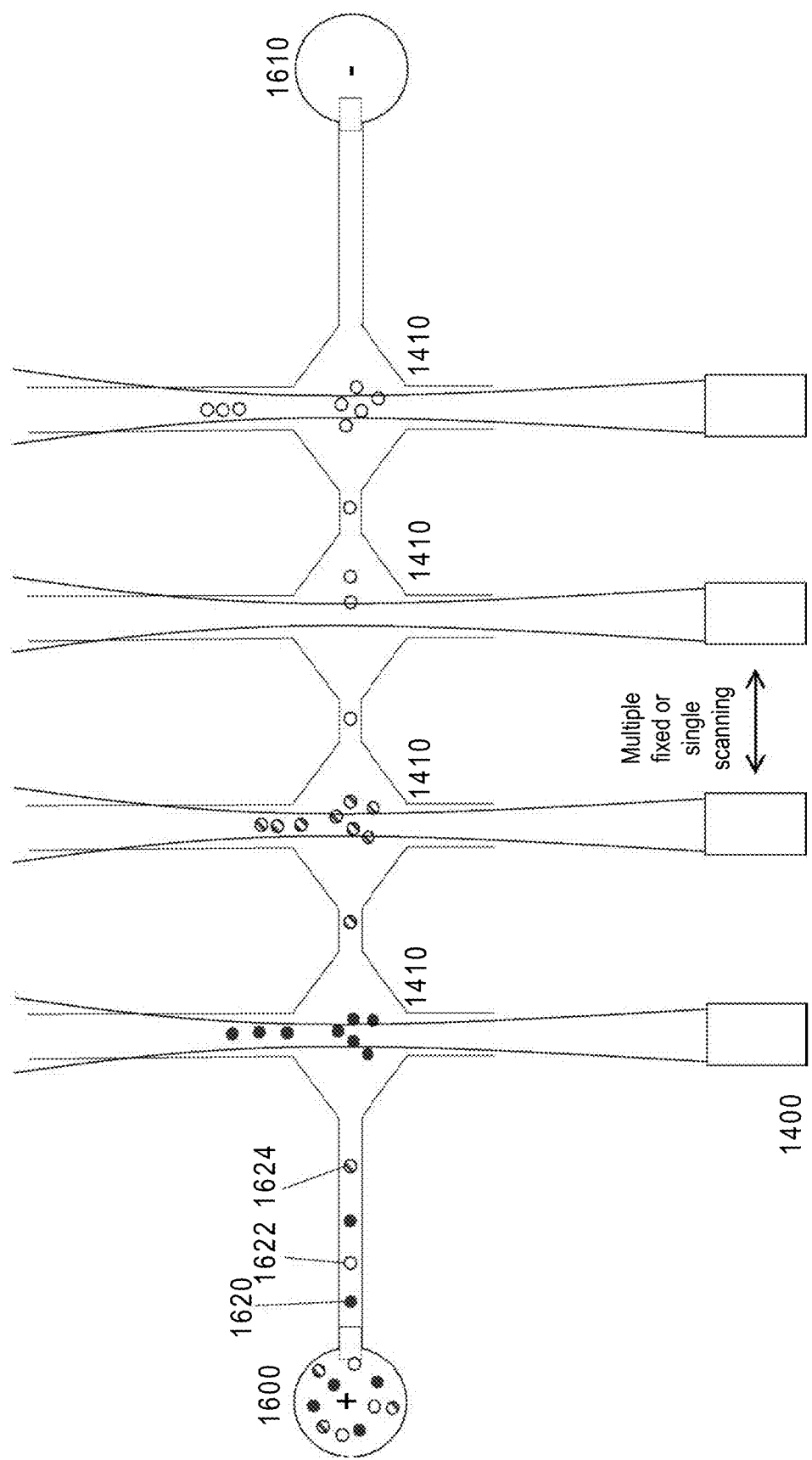
FIG. 16 provides a schematic showing microfluidic analysis of micro or nanoparticles using a device combining optical force, electrokinetic forces and Raman spectroscopy FIG. 17 provides a schematic showing microfluidic analysis of micro or nanoparticles using a device combining optical force, electrokinetic forces and Raman spectroscopy FIG. 18 provides a schematic showing microfluidic sorting of micro or nanoparticles using a device combining optical force, electrokinetic forces and Raman spectroscopy

FIG. 16 shows microfluidic analysis of cells, micro- or nanoparticles using a device combining optical force, electrokinetic forces and/or Raman spectroscopy. Electrokinetic force drive nanoparticles from the cathode (1600) toward the anode (1610) and they accumulate in the potential wells (1410) where Raman signals can be measured. Subsequently, active analysis can be performed using laser forces from multiple lasers (1400) located at each junction or a single laser scanned across the junctions. The device can contain one or multiple junctions. These lasers would apply optical force to drive particles against the fluid flow to measure nanoparticle properties. In one embodiment, cells or particles of differing properties (1620, 1622, 1624) accumulate at each junction according to their electrical properties. In an alternative embodiment, particles are moved based upon their electrokinetic forces and encounter a laser beam and are automatically propelled differing distances by the optical force generated by their individual biochemical and biophysical properties.

Figure 17:
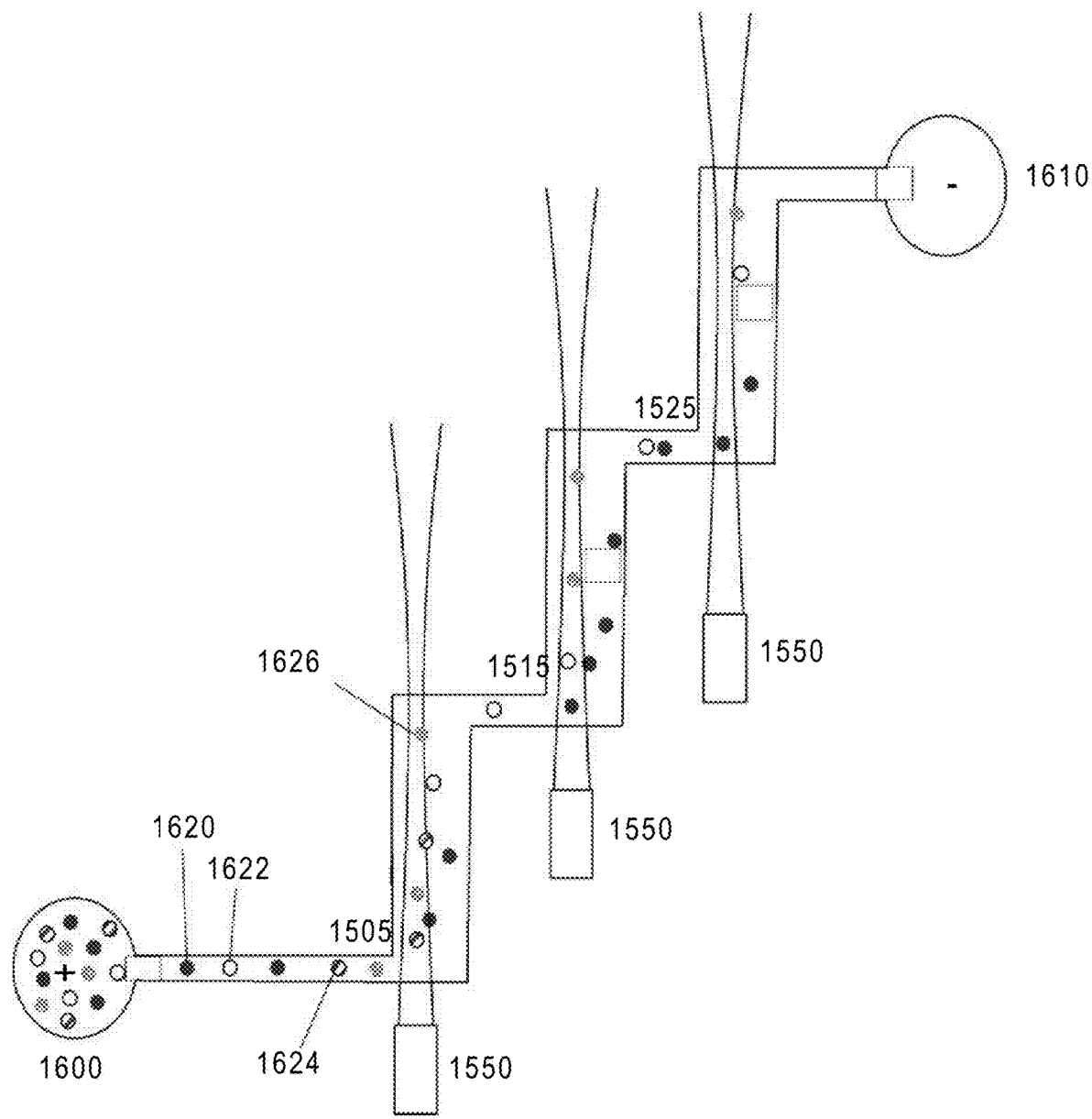

FIG. 17 shows microfluidic analysis of cells, micro- or nanoparticles using a device combining optical force, electrokinetic forces and/or Raman spectroscopy. Electrokinetic force drive nanoparticles toward the anode (1610) and at each junction, 1505, 1515, 1525, a laser beam (1550) drives particles through the channel. The device can contain one or multiple junctions. The degree to which a particle is driven by electrophoretic force/flow versus laser optical force will determine its trajectory. Particles with higher refractive index (1626) will be driven along the laser beam more than those with lower refractive index and likewise particles with great electrophoretic force will be driven away from the laser beam and toward the cascade of additional analysis regions. This competition between electrophoretic and optical forces provides the ability to analyze particles of differing composition. Other embodiments could include various combinations of magnetic, acoustic, electrokinetic, or optical forces, as well as Raman spectroscopy and/or pressure-based pumping. For example, a device combining optical force and Raman spectroscopy where the fluid is driven by pressure-based flow.

Figure 18:
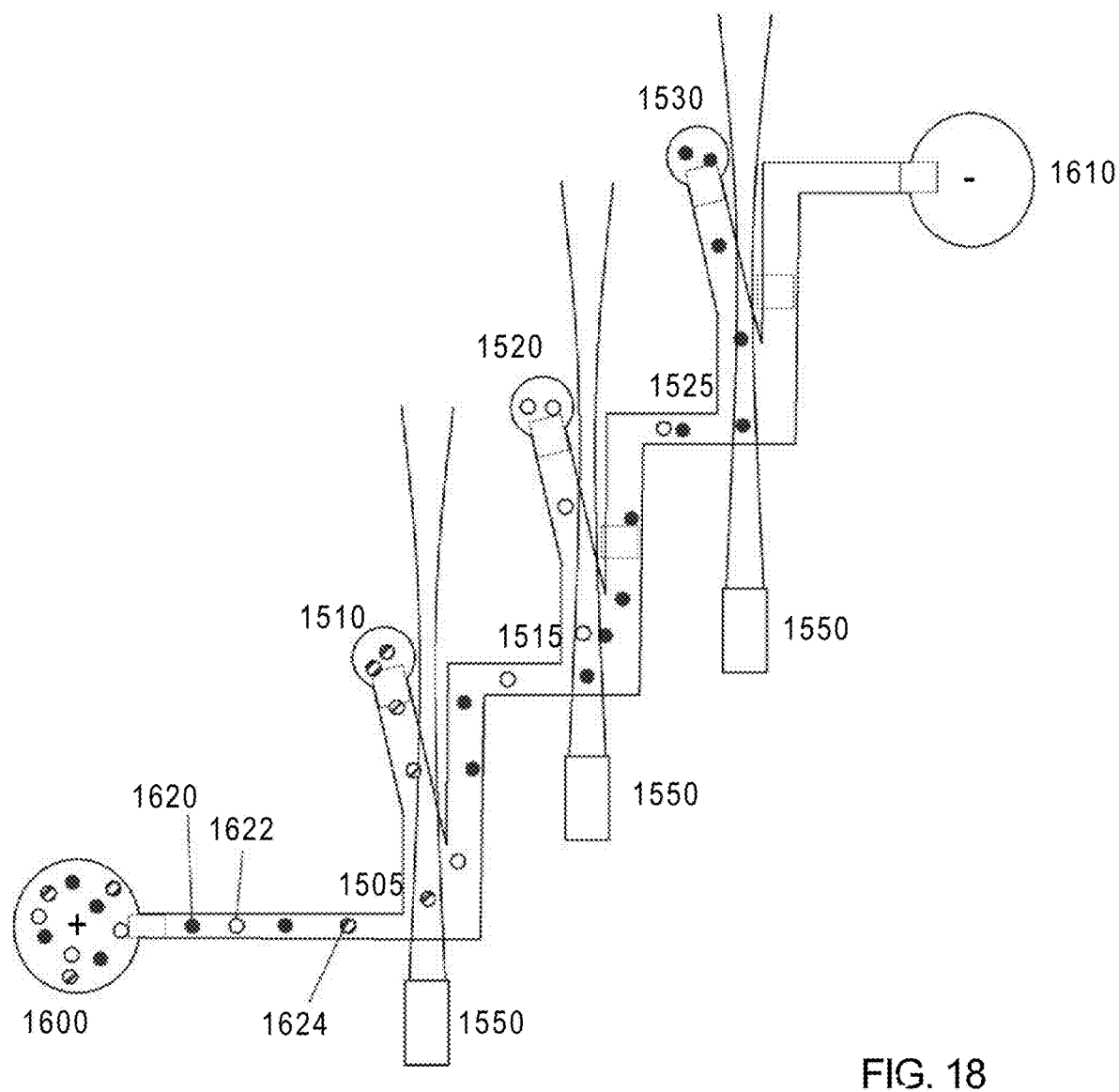

FIG. 18 shows microfluidic sorting of micro or nanoparticles using a device combining optical force, electrokinetic forces and/or Raman spectroscopy. Electrokinetic force drive nanoparticles toward the anode (1610) and at each junction, 1505, 1515, 1525, a split in the flow is introduced and a laser beam drives particles via optical pressure into a well or outlet 1510, 1520, and 1530 respectively. The device can contain one or multiple junctions. The degree to which a particle is driven by electrophoretic force/flow versus laser optical force will determine its separation path. Particles with higher refractive index will be driven into the separation channel/well more than those with lower refractive index and likewise particles with great electrophoretic force will be driven away from the separation channel or well and toward the cascade of additional separation regions. This competition between electrophoretic and optical forces provides the ability to separate particles of differing composition.

In an embodiment, provided herein are devices for automated analysis of one or more samples, wherein the process of automated analysis comprises automated flow, wherein the samples comprise liquid or particles in a sample vessel, and wherein the devices comprise an assembly of components that enable processing of a sample (or samples) for analytical assessment by fluidic and/or particle based instruments. The devices may comprise microfluidic components used for analyzing particle/cellular containing samples. In some embodiments, the microfluidic component may comprise an autosampler. In some embodiments, the device may comprise Radiance® (LumaCyte, Virginia USA). Also provided are methods for using such devices. In certain embodiments, devices of the invention include the added functionality of particle analysis and characterization of cells using a series of novel methods that combine hydrodynamic, optical, and electrokinetic forces with Raman spectroscopy.

In one embodiment, cellular and particle analysis is conducted in an off-line Raman arrangement. For example, analysis may occur in a well (i.e. as with an autosampler). In such an embodiment, sorted or unsorted cells may be directed into a reservoir capable of measuring Raman with a fiber optic probe. This type of analysis may be conducted in a variety of well plates including, but not limited to, 6, 12, 24, 48, 96, 192, 288, 384, or 1536 well plates and furthermore, the analysis may be conducted in a variable or fixed volume well or reservoir. A probe, such as a fiber optic probe, having a cavity and mixing capability to prevent the well plate from contributing background noise to the Raman measurement may be utilized. As fluid is drawn up (using hydrodynamic flow from a syringe pump or air pressure over fluid driven flow, or electroosmotic flow) during the sampling step it fills the cavity making a representative measurement. In certain embodiments, a sampling tube of suitable dimensions may be attached to the cavity part of the probe to draw up fluid into autosampler and make Raman measurements at the same time. This type of configuration allows a large fiber optic probe to be designed with filters and still access a small sample size. In certain embodiments, the analysis may take place in well plates with SERS active bottoms where cells accumulate; such well plates could be glass bottom and Raman measurements may be made from below or above.

In an alternative embodiment, the devices and methods of the invention may comprise particle or cellular analysis occurring on-chip in a separate region of the autosampler dedicated for Raman analysis. Various configurations of the device may be appropriate depending on the purpose and functionality of the task. For example, in some embodiments, the microfluidic channels may be split i.e. bi-furcation or tri-furcation (or more splits) of channel to direct fraction of cells to region for Raman measurement; the particles may be held with a laser beam in specific geometry, held with DEP, or laser DEP combination; optical forces may hold cells against wall with SERS active surface. In certain configurations, there may exist a single region that gets flushed out during a cleaning cycle in between samples (include a relief channel with an electronic pressure controller to handle flow after loading sample. The analysis may switch back to main waste channel to leave cells loaded in Raman chamber on chip.) In certain embodiments, a disposable chip with regions for 96 samples to collect and be measured may be used. In certain other embodiments, a user replaceable junction may be used wherein a chip holder and tubing connection or integrated connection to tubing (favored) is utilized. Additional features include sample interaction channels where a target cell could be held using laser/hydrodynamic forces or laser/electrokinetic forces and then have biochemicals or other cells or materials introduced; electrokinetic forces in zig-zag or sawtooth zones to trap and measure Raman signal; laser separation of nanoparticles from electrokinetic trapping zones; and on-chip real-time Raman measurement using LFC laser (the combination of lasers to induce optical forces and generate Raman signals simultaneously).

In an embodiment, the samples analyzed by the microfluidic devices described herein may include, but are not limited to, polymer, metal, glass, or alloy based particles, biological cells, plant cells (algal cells or others), prokaryotic cells (bacteria), eukaryotic cells, yeast, fungus, mold cells, red blood cells, neurons, egg cell (ovum), spermatozoa, white blood cells, basophils, neutrophils, eosinophils, monocytes, lymphocytes, macrophages, platelets, vesicles, exosomes, stromal cells, multicellular constructs such as spheroids, mesenchymal cells, and induced pluripotent stem cells (iPSCs), cancer cell lines, primary cancer cells, T cells, B cells, monocytes, macrophages, other white blood cells, red blood cells, genetically engineered T cells or any other engineered cell or gene therapy modified product as well as subcellular components including nuclei, mitochondria, or chloroplasts. The samples may be synthetically manufactured or obtained from natural sources. The samples may be obtained from bodily fluids or bodily matter, including but not limited to, tears, saliva, sputum, blood, plasma, lymph, urine, sweat, pus, nasal discharge or semen.

In an embodiment the analytical assessment by fluidic and/or particle based instruments includes, but is not limited to, measuring optical force, laser force cytology, Raman spectroscopy, automated microscopy, capillary electrophoresis, single cell droplet microfluidics, single cell genomics, sequencing devices, mass spectrometry, and nucleic acid or protein analysis, amplification, or modification.

In certain embodiments, the components for fluid handling in the device comprise an outer tube that fits within a sample vessel, one or more discrete inner tubes that fit within the diameter of the outer tube, together with optical fibers for spectroscopic sensing including but not limited to Raman spectroscopy, and a connection to one or more destination vessels that are fluidically connected to the sampling vessel, one or more separate systems for moving fluid in or out of the sampling vessel in a controlled manner. In some embodiments, a valve may be used to preferentially drive fluid into one or more of the inner tubes or prevent fluid from entering one or more of the inner tubes, and systems for moving fluid may comprise a vacuum system, a pressure-based system, or a pump such as a peristaltic, diaphragm, syringe, or other. In certain embodiments, the fluid handling device sits within a manifold that creates an air-tight seal against the sampling vessel or compartment thereof. The outer tube may be constructed of metal, plastic, ceramic, composite, glass/capillary, or other materials; the tube(s) may be constructed of metal, plastic, ceramic, composite, glass/capillary, or other materials. In some embodiments, the inner tube(s) is (are) connected to the outer tube in a reversible manner using a connector such as a fitting, sheath, ferrule, or other housing, or in a permanent manner, through the use of glue, epoxy, cement or other adhesive. In some embodiments, the outer tube and inner are manufactured as a single piece of one or more material types through the use of additive manufacturing techniques including 3D printing, such as stereolithography, digital light processing, fused deposition modeling, selective laser sintering, selective laser melting, electron beam melting, laminated object manufacturing, binder jetting, material jetting, or other techniques. Furthermore, the outer tube and inner may be manufactured from glass using laser patterning and hydrofluoric acid (HF) or potassium hydroxide (KOH) etching and bonding process. In additional embodiments, the inner tubes of the device are connected to one or more reservoirs of fluids that can be delivered to the sampling vessel or other vessels within the system. The fluids may be delivered to detach adherent cells growing in the sample device. The sample vessels comprise may comprise a vial or a well plate comprising 6, 12, 24, 48, 96, 192, 288, 384, 1536 or any custom number of wells.

In an embodiment, provided herein are microfluidic devices, systems and methods of using the same, comprising one or more fiber optic probes and one or more fluidic tubes, wherein the one or more fiber optic probes are designed to enable spectroscopic measurements, and wherein the one or more fluidic tubes consist of a sampling tube allowing for the introduction of a particle containing sample into an instrument and wherein the sampling tube enables the movement of particles relative to the optic fiber probes. The probes may comprise fiber optics for the delivery of the excitation light and collection of the Raman signal, the fluidic tubes may enable introduction of cells or particles into a sampling area, and the device may further comprise an enclosure enabling interaction of particles with a SERS or other Raman active surface. The probes may be constructed of polymer, plastic, glass, fused silica, liquid core waveguides, metal, composite or any other suitable material.

In some embodiments, the devices of the disclosure may comprise an integrated sampling tip; wherein the integrated sampling tip has customized dimensions for enabling access to higher density well plates with smaller wells. The integrated sampling tip may be produced by 3D printing or any other methods known to those skilled in the art. In certain embodiments, the sampling tip may be removable or detachable, and may also be reusable. The removable or detachable tip may clip onto probe housing with a band or clamp seal, wherein the probe housing may further comprise a Raman feature. In order to ensure probe integrity, a laser light sensor may be employed.

In certain embodiments, the tubes for sample loading may comprise capillaries and act as liquid core waveguide distributing the excitation light throughout the volume and collecting the emission or Raman signals throughout the same volume for enhanced sensitivity.

Provided herein are devices and methods for automated analysis of one or more samples, wherein the process of automated analysis comprises automated flow, wherein the samples comprise liquid or particles in a sample vessel, wherein the device comprises an assembly of components that enable processing of a sample for analytical assessment by fluidic and/or particle based instruments. In certain embodiments, one or more pathways of the microfluidic device may be designed for partitioning of cells, particles, fragments, or molecules by having a one or more channels in the microfluidic channel network. The devices may further comprise one or more fiber optic probes and one or more fluidic tubes, wherein the one or more fiber optic probes are designed to enable spectroscopic measurements, and wherein the one or more fluidic tubes consist of a sampling tube allowing for the introduction of a particle containing sample into an instrument and wherein the sampling tube enables the movement of particles relative to the optic fiber probes.

The analytical assessment by fluidic and/or particle based instruments comprises the use of Raman spectroscopy, optical forces, hydrodynamic forces and/or electrokinetic forces.

In certain embodiments, the devices of the present disclosure further comprise one or more features that enable the varying of flow rates or pressures between the one or more channels in the microfluidic channel network. The flow rates or pressures between the one or more channels in the microfluidic channel network are adjusted by optical, electrokinetic, or acoustic forces. As contemplated herein, optical forces may comprise optical tweezers, dual laser beams or laser force cytology and equivalents thereof.

The device may further comprise additional features such as wherein the one or more channels in the microfluidic channel network comprise a channel for dedicated analysis and a channel for waste. The dedicated analysis and a channel for waste may be adjusted, the diameters of the channels in the microfluidic channel network may be adjusted, and the device may further comprise one or more additional channels for the introduction of materials, wherein the one or more additional channels comprise a single analysis channel with a single input, or multiple analysis channels with a single or multiple inputs. Additional materials include, but are not limited to, molecules, exosomes, cells, biochemicals, bacteria, or viruses.

In certain embodiments, the device of the present disclosure may further comprise one or more regions facilitating the mixing of samples prior to analysis. The channels of the microfluidic channel network may be customized for any desired configuration, including by incorporating a T or Y junction, by adjusting the length, diameter, shape, or other dimension of the channels to adjust flow rate and enable precise analysis. The channel network may further comprise one or more collection wells or analysis regions within the microfluidic channel network for sorting and accumulation of cells for Raman or other spectroscopic analysis. Certain embodiments may comprise an additional waste or relief channel for splitting a sample. Certain embodiments may comprise one more collection wells or regions within microfluidic channels for accumulation of cells for Raman analysis and also comprise one or more waste or relief channels for splitting sample flow to enable flow or no flow in a Raman collection well (and channels). In certain embodiments, the devices herein may further comprise one or more collection wells or weirs within microfluidic channels for laser-based Raman or other spectroscopic analysis, and the depth and width of the wells can be adjusted in order to fine tune behavior. Optionally, the bottom of the wells or weirs may include an electrode or SERS material to facilitate Raman or other spectroscopic analysis. In certain embodiments, cells, particles, fragments, or molecules of the sample, are collected against a wall or other structure for analysis and fluidic, optical, magnetic, electrokinetic or acoustic forces are used to assist in the collection or release of cells detained in the collection wells or weirs.

In an embodiment of the present disclosure, methods for microfluidic analysis of a sample comprising cells, particles, fragments, or molecules comprising the use of a device for automated analysis of one or more samples, wherein the process of automated analysis comprises automated flow, wherein the samples comprise liquid or particles in a sample vessel, wherein the device comprises an assembly of components that enable processing of a sample for analytical assessment by fluidic and/or particle based instruments, wherein one or more pathways of the microfluidic device may be designed for partitioning of cells, particles, fragments, or molecules by having a one or more channels in the microfluidic channel network, wherein the one or more channels in the microfluidic channel network connect at one or more junctions, wherein the device further comprises one or more collection wells or weirs within microfluidic channels for laser-based Raman or other spectroscopic analysis, wherein a sample is loaded into the device, the rate and direction of flow the sample is controlled by combining optical force, and electrokinetic forces, and wherein the cells, particles, fragments, or molecules of the sample accumulate in the one or more collection wells or weirs where Raman signals can be measured. In certain embodiments, the devices further comprise one or more fiber optic probes and one or more fluidic tubes, wherein the one or more fiber optic probes are designed to enable spectroscopic measurements, and wherein the one or more fluidic tubes consist of a sampling tube allowing for the introduction of a particle containing sample into an instrument and wherein the sampling tube enables the movement of particles relative to the optic fiber probes. In certain embodiments, further analysis is enabled by using laser forces from multiple lasers optionally located at each junction or a single laser scanned across the junctions. Electrokinetic forces may drive cells, particles, fragments, or molecules of the sample towards an anode, and laser beams may be employed to drive particles through the microfluidic channel network.

In an embodiment, the present disclosure comprises methods for the microfluidic analysis of a sample comprising cells, particles, fragments, or molecules comprising the use of a device for automated analysis of one or more samples, wherein the process of automated analysis comprises automated flow, wherein the samples comprise liquid or particles in a sample vessel, wherein the device comprises an assembly of components that enable processing of a sample for analytical assessment by fluidic and/or particle based instruments, wherein one or more pathways of the microfluidic device may be designed for partitioning of cells, particles, fragments, or molecules by having a one or more channels in the microfluidic channel network, wherein the one or more channels in the microfluidic channel network connect at one or more junctions, wherein the device further comprises one or more collection wells or weirs within microfluidic channels for laser-based Raman or other spectroscopic analysis, wherein the device further comprises one or more fiber optic probes and one or more fluidic tubes, wherein the one or more fiber optic probes are designed to enable spectroscopic measurements, and wherein the one or more fluidic tubes consist of a sampling tube allowing for the introduction of a particle containing sample into an instrument and wherein the sampling tube enables the movement of particles relative to the optic fiber probes, wherein a sample is loaded into the device, the rate and direction of flow the sample is controlled by combining optical force, and electrokinetic forces, wherein the cells, particles, fragments, or molecules of the sample accumulate in the one or more collection wells or weirs where Raman signals can be measured wherein electrokinetic forces drive the cells, particles, fragments, or molecules of the sample toward the anode, wherein a split in the flow is introduced at the one or more junctions, and a laser beam drives the cells, particles, fragments, or molecules of the sample via optical pressure into a well, and wherein the competition between electrophoretic and optical forces provides the ability to separate particles according to differing composition.

The invention claimed is:

1. A microfluidic device comprising a probe housing comprising one or more fiber optic probes and one or more fluidic tubes, wherein the one or more fiber optic probes are designed to enable spectroscopic measurements of a particle containing sample in a vessel, and wherein the one or more fluidic tubes consist of a sampling tube allowing for the introduction of the particle containing sample from the vessel into an instrument and wherein the sampling tube enables the movement of particles in front of the fiber optic probes.

2. The device of claim 1, wherein the probe comprises fiber optics for the delivery of excitation light and collection of a Raman signal.

3. The device of claim 1, wherein the fluidic tube enables introduction of cells or particles into a sampling area.

4. The device of claim 1, further comprising an enclosure enabling interaction of particles with a SERS or other Raman active surface.

5. The device of claim 1, further comprising an integrated sampling tip.

6. The device of claim 5, wherein the integrated sampling tip is configured to access plates with 96 to 1536 wells.

7. The device of claim 1, wherein the probe housing further comprises a removable/detachable tip.

8. The device of claim 7, wherein the removable/detachable tip clips onto probe housing with a band or clamp seal.

9. The device of claim 1, wherein the sampling tube is a capillary and acts as liquid core waveguide distributing excitation light throughout a volume and collecting the emission or Raman signals throughout the same volume for enhanced sensitivity.

10. A microfluidic device for automated analysis of one or more samples,
wherein the automated analysis comprises automated flow,
wherein the one or more samples comprise liquid or particles in a sample vessel,
wherein the device comprises the microfluidic device of claim 1,
wherein one or more pathways of the microfluidic device is designed for partitioning of cells, particles, fragments, or molecules by having a one or more channels in a microfluidic channel network.

11. The device of claim 10, wherein the microfluidic device is configured to enable an analytical assessment by fluidic and/or particle based instruments comprises the use of Raman spectroscopy, optical forces, hydrodynamic forces and/or electrokinetic forces.

12. The device of claim 10, further comprising one or more features that enable the varying of flow rates or pressures between the one or more channels in the microfluidic channel network.

13. The device of claim 12, wherein the flow rates or pressures between the one or more channels in the microfluidic channel network are adjusted by optical, electrokinetic, or acoustic forces.

14. The device of claim 10, wherein the one or more channels in the microfluidic channel network comprise a channel for dedicated analysis and a channel for waste.

15. The device of claim 10, further comprising one or more additional channels for the introduction of materials, wherein the one or more additional channels comprise a single analysis channel with a single input, or multiple analysis channels with a single or multiple inputs.

16. The device of claim 15, wherein the materials comprise molecules, exosomes, cells, biochemicals, bacteria, or viruses.

17. The device of claim 10, further comprising one or more regions facilitating the mixing of samples prior to analysis.

18. The device of claim 10, wherein the one or more channels in the microfluidic channel network comprise a T or Y junction.

19. The device of claim 10, wherein the length, diameter, or shape of the one or more channels in the microfluidic channel network may be adjusted to control flow rate to enable precise analysis.

20. The device of claim 19, further comprising a collection well or analysis region within the microfluidic channel network for sorting and accumulation of cells for Raman or other spectroscopic analysis.

21. The device of claim 20, wherein the bottom of the well or weir includes an electrode or SERS material to facilitate Raman or other spectroscopic analysis.

22. A method for microfluidic analysis of a sample comprising cells, particles, fragments, or molecules comprising the use of the microfluidic device of claim 1 for automated analysis of one or more samples,
wherein one or more pathways of the microfluidic device are designed for partitioning of cells, particles, fragments, or molecules by having a one or more channels in a microfluidic channel network,
wherein the one or more channels in the microfluidic channel network connect at one or more junctions,
wherein the cells, particles, fragments, or molecules are loaded into the device, the rate and direction of flow the sample is controlled by a combination of acoustic, magnetic, optical, and/or electrokinetic forces,
and wherein the cells, particles, fragments, or molecules of the sample accumulate in the sampling tube where Raman signals can be measured.

23. The device of claim 21, further comprising one or more fiber optic probes and one or more fluidic tubes, wherein the one or more fiber optic probes are designed to enable spectroscopic measurements, and wherein the one or more fluidic tubes consist of a sampling tube allowing for the introduction of a particle containing sample into an instrument and wherein the sampling tube enables the movement of particles relative to the fiber optic probes.

24. The device of claim 21 wherein particles are driven toward an anode via electrokinetic forces and laser generated optical force moves cells into channels separated from the main flow to create separated particles or cells.

* * * * *